United States Patent
Blomquist

(10) Patent No.: US 9,993,933 B2
(45) Date of Patent: Jun. 12, 2018

(54) PRECUT PROCESSING OF LOGS BY CUTTING PARTIALLY THROUGH A WORKPIECE

(71) Applicant: USNR, LLC, Woodland, WA (US)

(72) Inventor: Christopher W. Blomquist, Ridgefield, WA (US)

(73) Assignee: USNR, LLC, Woodland, WA (US)

( * ) Notice: Subject to any disclaimer, the term of this patent is extended or adjusted under 35 U.S.C. 154(b) by 0 days. days.

(21) Appl. No.: 15/087,056

(22) Filed: Mar. 31, 2016

(65) Prior Publication Data

US 2016/0288354 A1    Oct. 6, 2016

Related U.S. Application Data

(60) Provisional application No. 62/141,062, filed on Mar. 31, 2015.

(51) Int. Cl.
 *B26D 5/00* (2006.01)
 *B26D 11/00* (2006.01)
 *G05B 19/19* (2006.01)

(52) U.S. Cl.
 CPC ........... *B26D 5/005* (2013.01); *B26D 5/007* (2013.01); *B26D 11/00* (2013.01); *G05B 19/19* (2013.01); *G05B 2219/36515* (2013.01); *G05B 2219/45229* (2013.01); *G05B 2219/49372* (2013.01)

(58) Field of Classification Search
 None
 See application file for complete search history.

(56) References Cited

U.S. PATENT DOCUMENTS 3,204,674 A * 9/1965 Griffin ................. B23D 45/105
 144/373
3,347,289 A * 10/1967 Zizka .................. B23D 45/105
 144/162.1
4,895,197 A * 1/1990 Andersen ............... B23D 47/08
 144/3.1

(Continued)

OTHER PUBLICATIONS

Millwide Insider, Issue #2 2013, U.S. Natural Resources, Inc., particularly pp. 8 and 9.*

(Continued)

*Primary Examiner* — Mohammad Ali
*Assistant Examiner* — Bernard G Lindsay
(74) *Attorney, Agent, or Firm* — Schwabe Williamson & Wyatt

(57) ABSTRACT

A precut module with one or more profiling heads and/or circular saws may be provided upstream of a saw module. The precut module may be used to implement a portion of a cut that would otherwise be made by the saw module, thereby reducing the depth of cut required at the saw module. In some embodiments, profiling heads may be used to profile a block that is wider than a desired side board. The block may be cut from the workpiece and sent to the edger. This may provide the same or better wood volume recovery and/or throughput speed than profiling the side board or cutting the side board from a flitch. In some embodiments, cut patterns for the precut module and other machine centers may be calculated and/or selected based on a desired depth of cut at the saw module, desired throughput speed, wood volume recovery, and/or other parameters.

28 Claims, 20 Drawing Sheets

(56) References Cited

U.S. PATENT DOCUMENTS

| | | | |
|---|---|---|---|
| 5,142,955 A | | 9/1992 | Hale |
| 5,578,229 A | * | 11/1996 | Barnekov ................ B27M 1/06 |
| | | | 219/121.67 |
| 6,062,280 A | | 5/2000 | Newnes et al. |
| 6,526,856 B2 | | 3/2003 | Newnes |
| 9,505,072 B2 | * | 11/2016 | Barker ................ B23D 59/008 |
| 2005/0011328 A1 | * | 1/2005 | McGehee ................ B27B 5/36 |
| | | | 83/523 |
| 2006/0219071 A1 | | 10/2006 | Pobuda et al. |
| 2014/0244023 A1 | | 8/2014 | Saastamo |
| 2015/0352743 A1 | * | 12/2015 | McGehee ................ B27C 5/00 |
| | | | 144/134.1 |

OTHER PUBLICATIONS

PCT Application No. PCT/US2016/025350 International Search Report and Written Opinion dated Jul. 11, 2016, 34 pages.
Canadian Patent Application No. 2925587 Office Action dated May 30, 2016, 4 pages.
Canadian Patent Application No. 2925587 Office Action dated Dec. 19, 2016, 5 pages.
Canadian Patent Application No. 2925587 Office Action dated May 29, 2017.

* cited by examiner

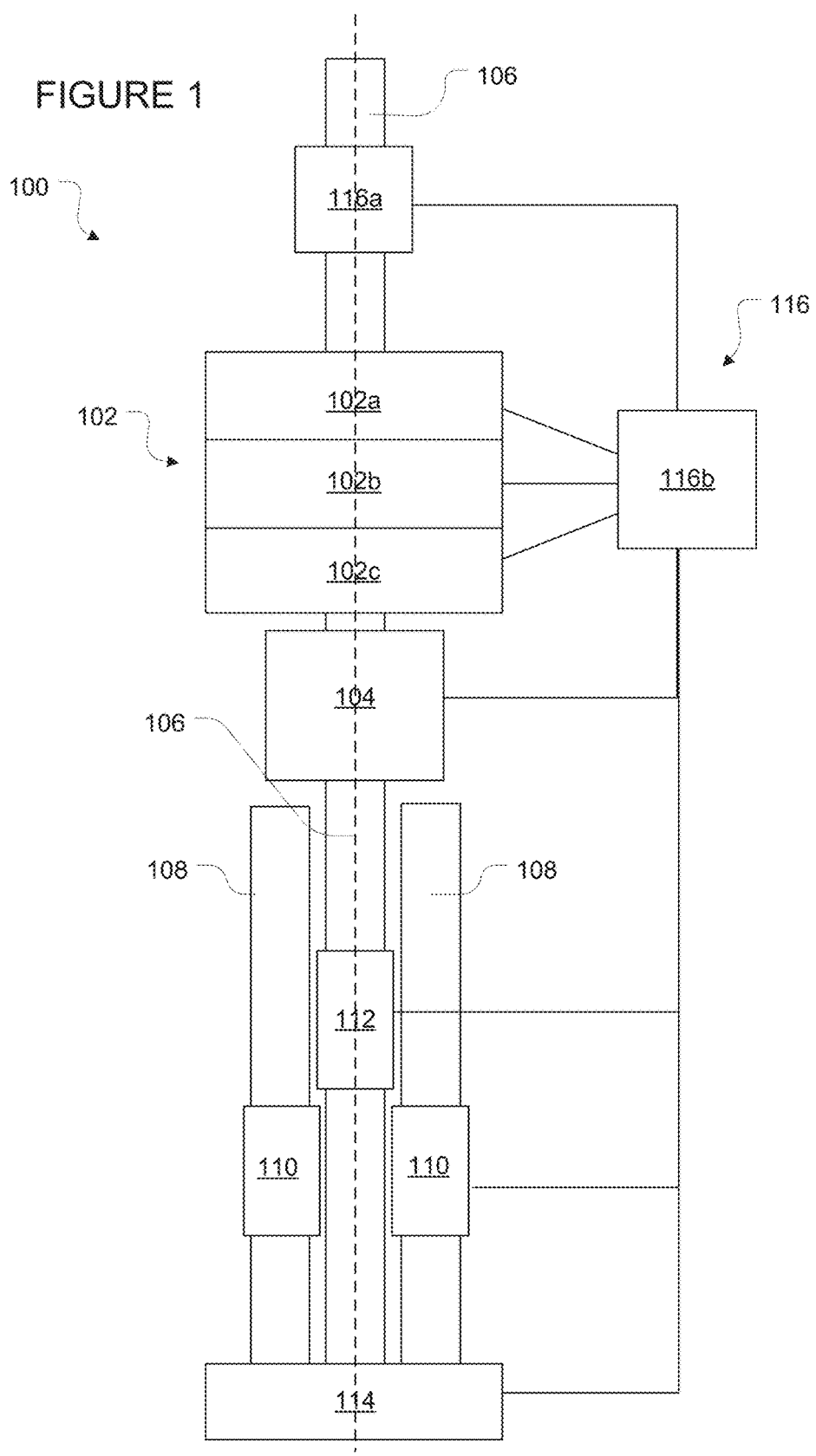

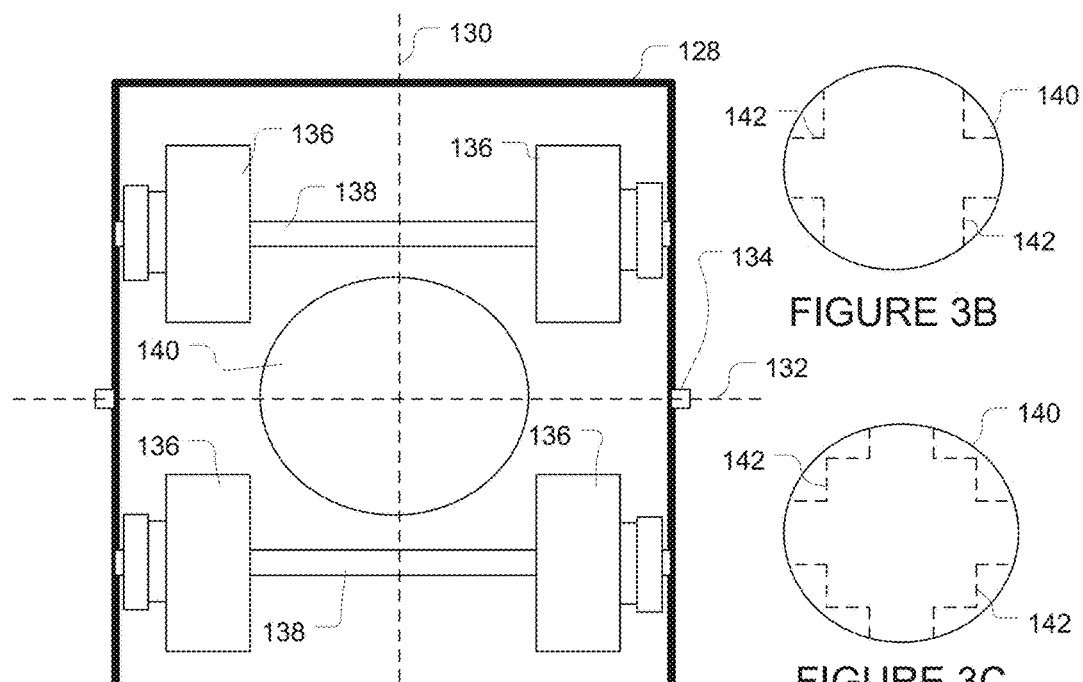
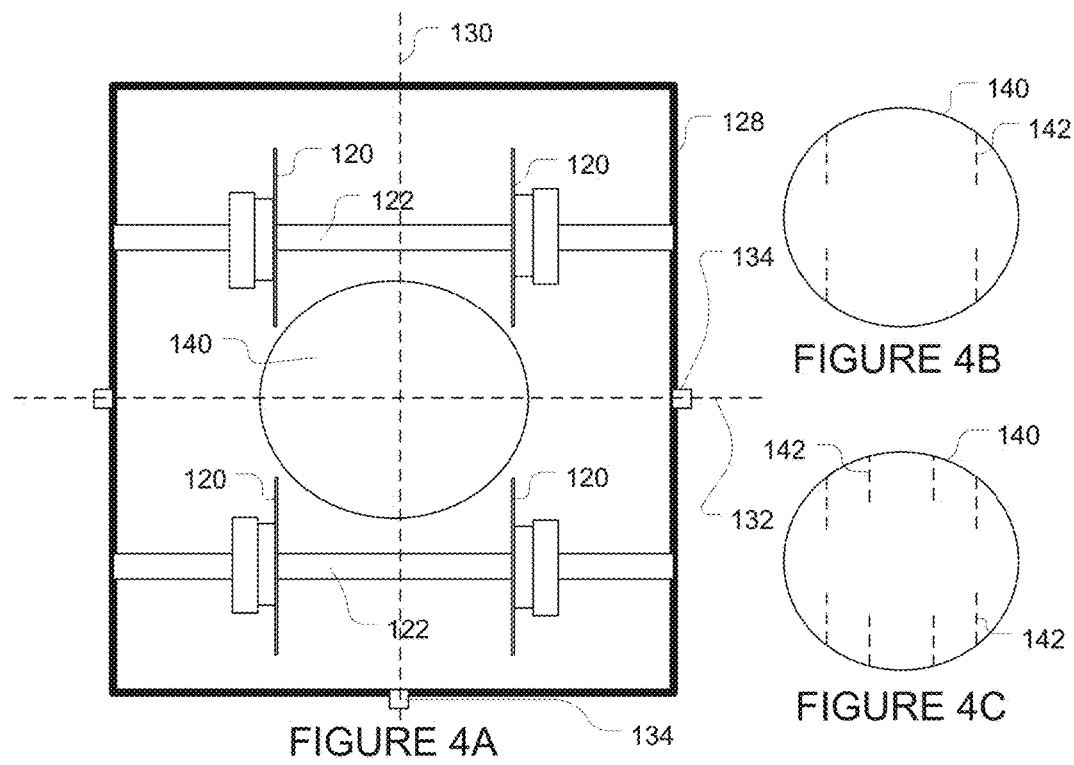

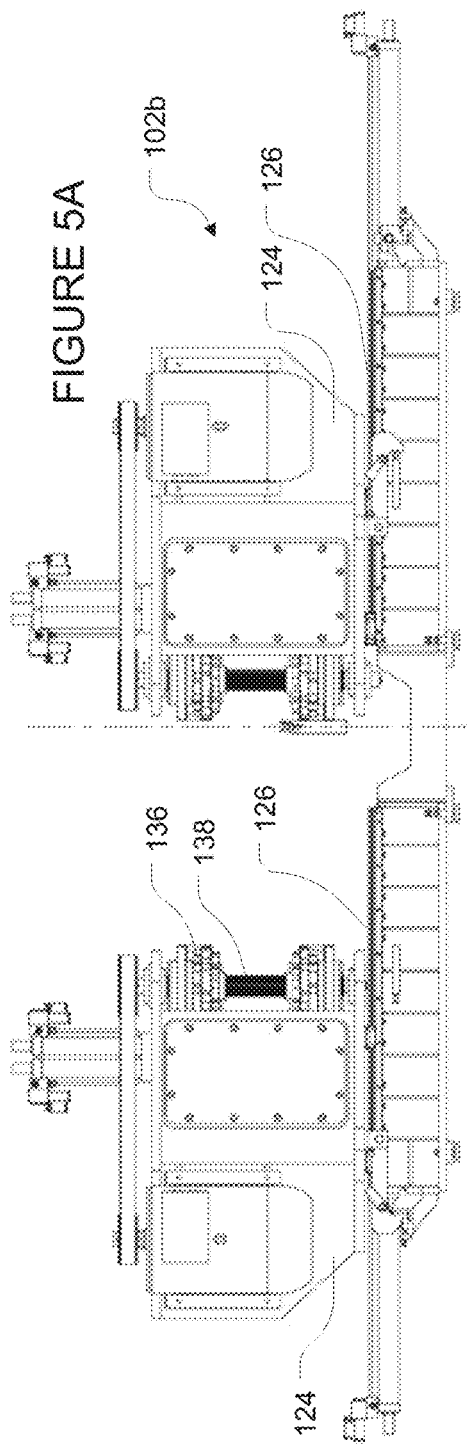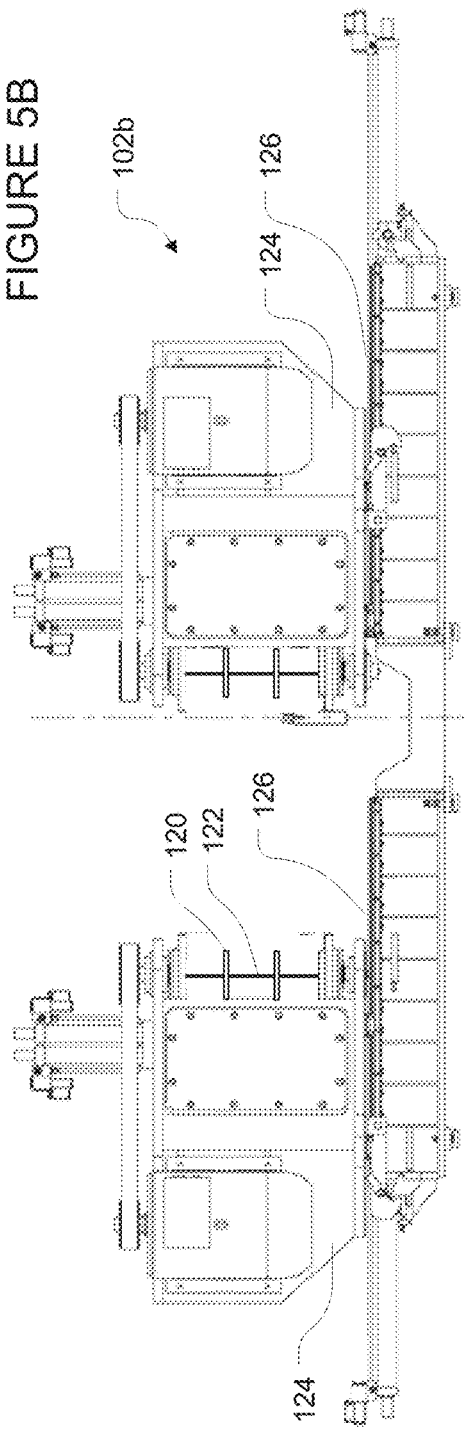

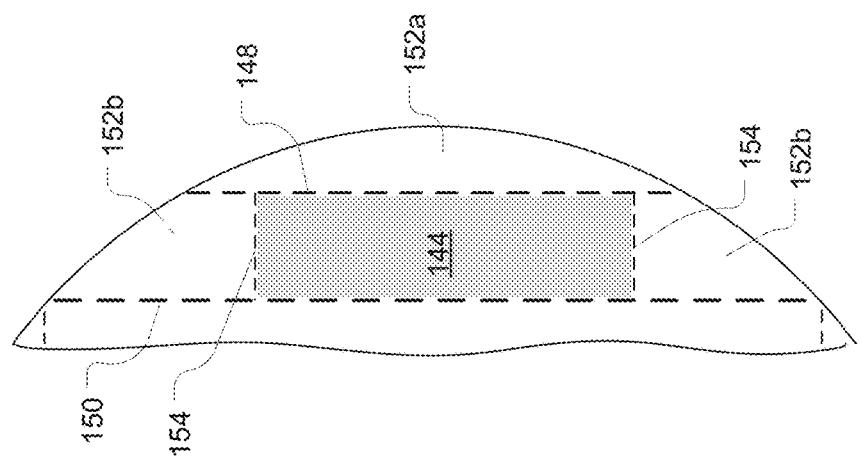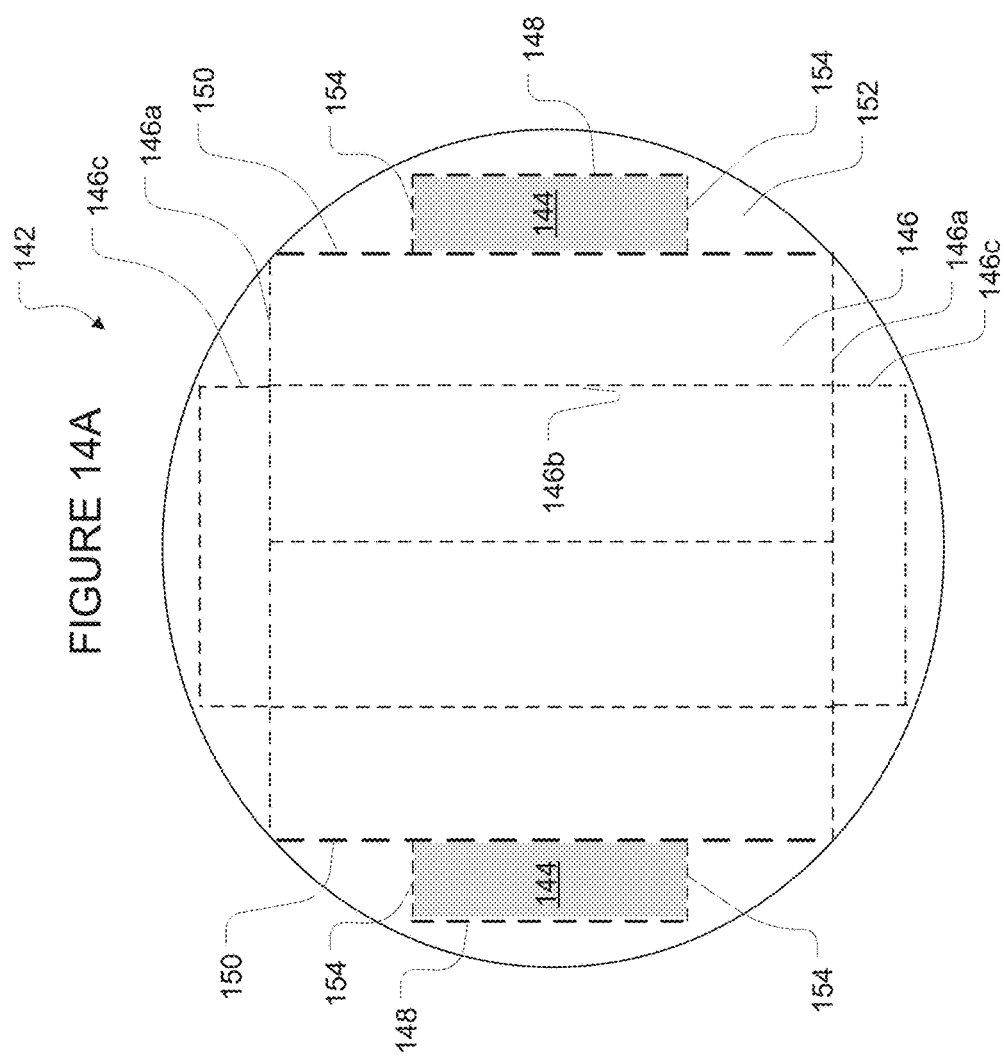

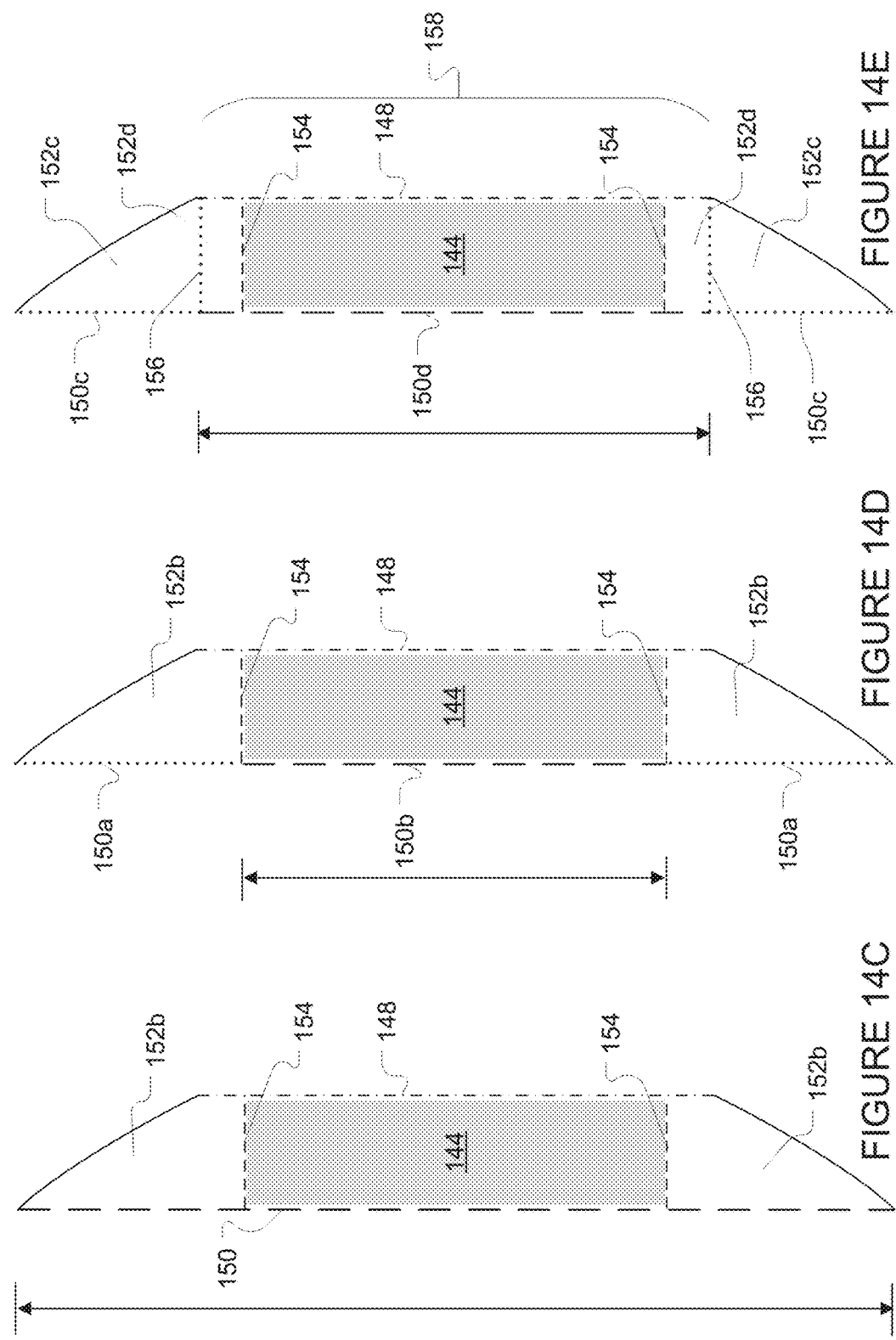

PRECUT PROCESSING OF LOGS BY CUTTING PARTIALLY THROUGH A WORKPIECE

CROSS-REFERENCE TO RELATED APPLICATIONS

This application claims the benefit of U.S. Provisional Patent Application No. 62/141,062, filed Mar. 31, 2015 titled "Precut Processing of Logs," the entire disclosure of which is incorporated by reference herein.

BACKGROUND

Logs are typically processed in two or more phases. The first phase, or primary breakdown, involves chipping/cutting the logs into one or more pieces. Additional cuts are made to some or all of the pieces in the second phase, or secondary breakdown. Due to their generally cylindrical shape, logs are often cut to obtain side boards from the curved outer periphery of the log. The side boards are produced at a desired width, and are subsequently trimmed to a desired length downstream of the secondary breakdown system.

Some processing lines are configured to produce side boards in the primary breakdown phase. These primary breakdown systems usually have a chipper, a profiler, and a saw module. The chipper chips open faces along opposite sides of the log to form a cant. The profiler chips the sides of the cant to form the profile of the desired side boards. The saw module cuts through the cant to release the side boards from the remainder of the cant.

Other processing lines are configured to produce side boards in the secondary breakdown phase. In common configurations the primary breakdown system has a chipper and a saw module, and the secondary breakdown system has an edger. The chipper chips open faces along opposite sides of the log, and the saw module cuts through the resulting cant to sever flitches from the remainder of the cant. The edger cuts the flitches longitudinally to produce the desired side boards.

In the first configuration, the longitudinal sides of the side boards are formed by the profiler before the side boards are cut from the cant. In the second configuration, the longitudinal sides of the side boards are formed by the edger after the flitch has been cut from the cant.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1 illustrates a schematic plan view of a processing line with a precut module;

FIG. 3A illustrates a schematic view of a profiler section of a precut module;

FIGS. 3B-3C illustrate schematic views of examples of cut patterns for a profiler section;

FIG. 4A illustrates a schematic view of a precut saw section of a precut module;

FIGS. 4B-4C illustrate schematic views of examples of cut patterns for a precut saw section;

FIGS. 5A-5B illustrate front elevational views of profiler and precut saw section configurations;

FIGS. 14A-H illustrate schematic views of alternative cut patterns for a predicted cut product;

DETAILED DESCRIPTION OF DISCLOSED EMBODIMENTS

Figure 2A:
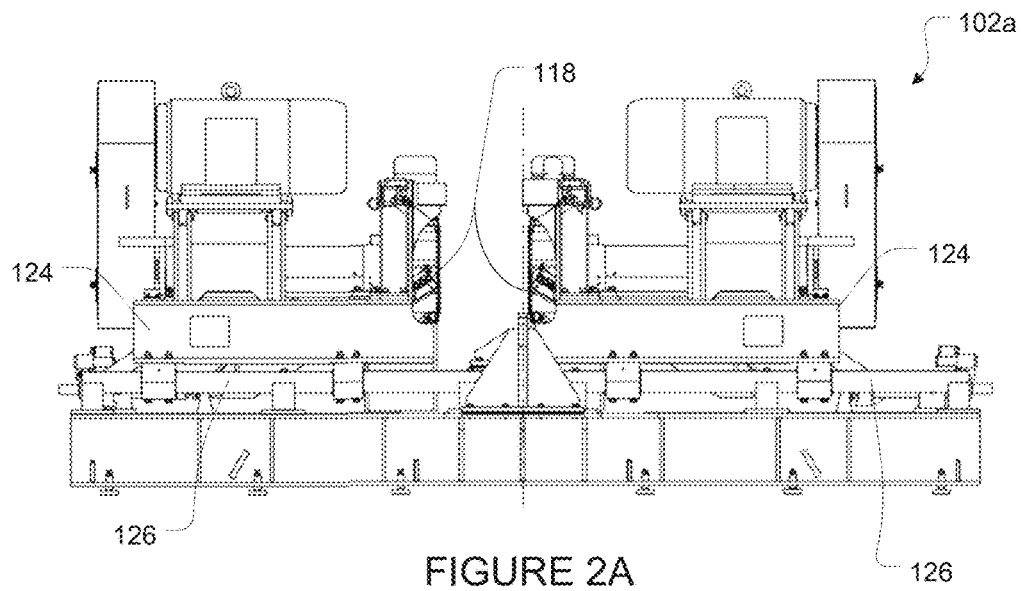
FIGS. 2A-2B illustrate examples of a chipper/precut saw section of a precut module.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

In some embodiments, a computing device may be endowed with one or more components of the disclosed apparatuses and/or systems, and may be employed to perform one or more methods as disclosed herein.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As used herein, the terms "depth of cut" and "cut depth" refer to the thickness of the material, along the plane of the cut, through which the cut is to be made. Generally, the depth of cut required to cut through a given workpiece along a given plane is substantially equal to the thickness of the workpiece along the plane of the cut. The depth of cut required to cut only partially through the workpiece is substantially equal to the thickness (along the plane of the cut) of the corresponding portion of wood that is to be cut. The location of that portion of wood relative to the rest of the workpiece does not dictate the depth of cut. For example, completing the last four inches of a ten-inch through-cut requires a four inch depth of cut, whether the last four inches is at one end of the through-cut or between the ends of the through-cut.

As used herein, a "workpiece" is a piece of wood or wood substitute material. Examples of workpieces include, but are not limited to, felled trees, stems, logs, slabs, cants, flitches, boards, veneer, plywood, laminated lumber/timber, fiberboard, insulation board, oriented-strand-board, hard-board, particle board, and any other pieces of solid wood or wood substitute materials such as (but not limited to) any wood composite material (e.g., fiber-plastic composites, fiber-cement composites), engineered/formed wood product, or other wood substitutes (e.g., cork, bamboo, plastics).

As used herein, the term "cut product" refers generally to any workpiece cut from a larger workpiece. A "final cut product" is a workpiece to which no additional cuts are to be made by the primary or secondary breakdown systems. In contrast, an "intermediate cut product" is a workpiece to which one or more additional cuts are to be made by the primary or secondary breakdown systems to obtain a final cut product.

As used herein, a "primary workpiece" is a workpiece that is round, ovoid, or otherwise non-rectangular in cross-section. Examples of primary workpieces include, but are not limited to, logs and stems. Logs that have been cut or chipped along one, two, or three sides of the log can also be "primary workpieces." Primary workpieces may be considered to have a central portion that is generally rectangular in cross-section and one or more peripheral portions that is/are roughly crescent-shaped in cross-section. A primary workpiece can be cut longitudinally to obtain various cut products including, but not limited to, flitches, cants, slabs, side boards, and blocks.

As used herein, the terms "flitch" and "cant" refer to cut products with generally opposite faces that are machined (e.g., chipped or sawn) and longitudinal sides that are portions of the outer surface of the primary workpiece. A flitch includes less than half of the central portion of the primary workpiece. In contrast, a cant includes at least half of the central portion of the primary workpiece. A "slab" is a cut product with one machined face and a curved outer surface. A slab may represent some or all of a peripheral portion of a primary workpiece.

As used herein, the terms "side board" and "block" refer to cut products that have generally opposite machined faces and at least one longitudinal side that is machined along all or part of its length, A "side board" has the longitudinal sides and width of the corresponding final cut product. In contrast, a "block" is wider than the corresponding final cut product, and does not have both longitudinal sides of the final cut product. Thus, a block must be cut longitudinally to obtain corresponding final cut product. A block is necessarily an intermediate cut product, but a side board can be either an intermediate cut product or a final cut product (e.g., after being trimmed to the desired length).

As used herein, a "cut solution" is a plan or scheme according to which a workpiece can be cut into one or more smaller workpieces of substantially predefined dimensions. Typically, a cut solution defines a group of predicted cuts and their spatial arrangement relative to one another, and the predicted cuts collectively define the dimensions of the predicted workpiece(s). Some cut solutions may define one or more predicted cuts that would produce only one predicted workpiece. Others may define multiple predicted cuts that would produce two or more predicted workpieces. Some cut solutions may also define the spatial arrangement of predicted workpieces relative to one another, and/or to the primary workpiece, prior to implementation of the cut solution. Optionally, in some embodiments a cut solution may be represented as a group of cut lines. For example, a cut solution may be represented as a group of cut lines on a 2D/3D model of the primary workpiece to indicate the arrangement and locations of the predicted cuts and predicted workpieces relative to the primary workpiece.

As used herein, a "cut pattern" is a plan or scheme for implementing a corresponding cut solution or some portion thereof. Typically, a cut pattern defines the location(s) of one or more of the predicted cuts relative to a corresponding workpiece, which may be either the primary workpiece or a cut product. Optionally, a cut pattern may be define the location(s) of the cut line(s) relative to an image or 2D/3D model of the corresponding workpiece. The electronic instructions or commands that cause a cutting device to make the predicted cut(s) in the given workpiece at the defined locations may also be referred to as a "cut pattern." Thus, in some embodiments a cut pattern may designate or identify a particular cutting machine or machine center (e.g., chipper, profiler, gang saw, band saw, or edger), and/or a particular cutting member (e.g., a particular saw blade, profiling head, or chip head, or edger saw) that is to make the predicted cuts in the workpiece.

In some cases, a group of cut patterns for a given cut solution may include all of the cut patterns required to fully implement the cut solution. In other cases, a group of cut patterns may include only the cut pattern(s) that corresponds to a particular part of the cut solution. For example, the configuration of a processing line might allow some predicted cut lines (e.g., those that define the longitudinal sides and inner face of a predicted side board) to be implemented in any of several different ways by different combinations of machine centers. For that part of the cut solution, multiple groups of cut patterns may be calculated, and each of the groups may include cut patterns for the corresponding machine centers. But another predicted cut line (e.g., one that defines the outer face of the predicted side board or the inner face of a predicted center board) might be implemented in a given way regardless of which group of cut patterns is implemented. A single cut pattern may be calculated for implementing that predicted cut line, and may or may not be included in each group of cut patterns. Alternatively, a cut pattern for that predicted cut line could be calculated separately for each group of cut patterns. Thus, in some embodiments two group of cut patterns may include at least one cut pattern that is common to both. In other embodiments, two groups of cut patterns may lack a cut pattern that is common to both.

In prior breakdown systems and methods, a workpiece such as a log is cut sequentially into pieces by saws or by a combination of chippers/profilers and saws. Each saw cut is a through-cut. The speed at which a given saw module can process a workpiece depends in part on the depth of cut required. As the required depth of cut increases, throughput speed through the saw module decreases, and vice versa.

The throughput speed of the processing line is limited by the slowest machine center, which is often a saw module. Chippers and profilers are generally capable of higher throughput speeds than saws. Therefore, one way to reduce the depth of cut is to remove all of the extraneous wood that would otherwise be cut by the saw. This is done by using profiler upstream of the saw module to chip away all of the wood that lies within the plane of the desired cut product (e.g., a side board) between the desired cut product and the corresponding outer surface of the workpiece. The remaining portion of wood has the longitudinal sides, width, and one face of the desired cut product. This portion can be severed from the rest of the workpiece at the saw module and trimmed to obtain the side board. The depth of cut required at the saw module is thereby reduced from the width of the workpiece (e.g., as is necessary to cut a flitch from the workpiece) to the lesser width of the side board. The reduction in the required depth of cut allows the saw module to operate at greater speed.

Although profiling the side board may provide a benefit in terms of throughput speed, there may be a cost in terms of recovery. An edger may cut a side board from a flitch with greater accuracy/precision than would be obtained by profiling to the desired dimensions. Thus, in some cases profiling a side board may be faster, but less accurate/precise, resulting in lower recovery. The relative value of each option is affected by factors such as raw material costs, equipment-related costs, the market price/value of the various cut product(s), and the cut patterns of preceding/succeeding workpieces. For example, as material costs decline, maximizing throughput may become more valuable than maximizing recovery, which tips the scale in favor of profiling the side board instead of using the edger to cut the side board from a flitch. As material costs rise, the reverse may be true.

Embodiments described herein provide methods, systems, and apparatuses for processing workpieces to increase throughput without significantly reducing recovery, or vice versa.

In various embodiments, a precut module with one or more cutting members, such as profilers and/or circular saws, may be used to cut a workpiece in order to remove material that would otherwise be sawn by a downstream saw module. This may effectively reduce the depth of cut required at the saw module, which may in turn increase the rate at which the saw module can process the workpiece.

In some embodiments, the precut module may include a profiler section. The profiler section may be used to form the profile of a block that is wider than a desired cut product (e.g., a side board). The block may be severed by the saw module and sent to an edger to be cut longitudinally to the width of the desired cut product. Removing some, but not all, of the extraneous material around the desired cut product may allow faster throughput through the saw module than cutting a corresponding flitch. In addition, the straight edges of the block may allow the edger to position and cut the block more quickly/accurately than a flitch, which may increase wood volume recovery. Using the edger to form the longitudinal sides of the desired cut product may provide greater cutting accuracy, more options for final cut products, and/or increased wood volume recovery than profiling the workpiece to the width of the desired cut product.

In other embodiments, the precut module may have one or more precut saws. The precut saw(s) may be used to cut the workpiece along a first portion of a predicted cut line, and a downstream saw module may be used to cut the workpiece along a remaining second portion of the predicted cut line to thereby complete a through-cut through the workpiece. The precut saws may be one or more circular saws that are operable to cut partially through the workpiece. The downstream saw module may include one or more circular saws, band-type saws, or any other type of cutting member suitable for use to complete the cut begun by the precut saw(s). Distributing the required depth of cut among the first and second saws may allow faster throughput through the downstream saw module.

In some embodiments, the precut module may be operatively coupled with a scanner/optimizer system. The scanner/optimizer system may be configured to calculate two or more groups of cut patterns for a given workpiece. One of the groups of cut patterns may include a cut pattern configured for implementation by a profiler, and another of the groups of cut patterns may include a cut pattern configured for implementation by an edger. Optionally, another of the groups of cut patterns may include a cut pattern configured for implementation by the profiler and another cut patter configured for implementation by the edger. The scanner/optimizer system may be configured to determine a value for each group of cut patterns based on predicted throughput speed, wood volume recovery, and/or one or more other parameters, and to select one of the groups of cut patterns for implementation based on the determined value.

In other embodiments, the scanner/optimizer may be configured to calculate a cut solution and/or cut pattern(s) based at least in part on a threshold value for a given parameter, such as throughput speed or wood volume recovery. For example, the scanner/optimizer may be configured to calculate the cut solution/pattern(s) that represents the greatest wood volume recovery attainable for a predetermined throughput speed through a saw module, or the greatest throughput speed attainable for a predetermined wood volume recovery. As another example, the scanner/optimizer may be configured to calculate the cut solution/pattern(s) that represents the best value, in terms of a given variable (e.g., greatest profit, shortest time to fill an order for a customer, greatest throughput volume through the processing line, or smallest gaps between workpieces), that is attainable in view of another predetermined parameter (e.g., throughput speed, wood volume recovery, profit, positioning range of a cutting member).

FIG. 1 illustrates a schematic plan view of a workpiece processing system with a precut module, in accordance with various embodiments. Examples of precut module configurations, saw modules, and processing lines are illustrated in FIGS. 2-13 and discussed further below. FIGS. 14A-G illustrate schematic views of a cut solution and corresponding cut patterns.

Referring first to FIG. 1, in various embodiments a workpiece processing system 100 may include a primary breakdown system and a secondary breakdown system. The primary breakdown system may include a precut module 102 and a first saw module 104 downstream of precut module 102. The secondary breakdown system may include a second saw module 110 downstream of first saw module 104. Workpiece processing system 100 may further include one or more additional components, such as a scanner/optimizer system 116, one or more conveyors 106/108, a third saw module 112 and/or a fourth saw module 114. In some embodiments, second saw module 108 may be an edger, third saw module 112 may be a gang saw, and fourth saw module 114 may be a trimmer. Optionally, precut module 102, first saw module 104, and/or third saw module may be arranged sequentially along a flow axis (FIG. 1, dashed line). In some embodiments, second saw module 108 and/or fourth saw module 114 may be arranged along the same flow axis or along other paths of flow.

Precut Module

The precut module 102 may be operable to chip or cut a workpiece along part of a predicted through-cut upstream of the first saw module. The resulting reduction in the depth of cut required at the first saw module to complete the through-cut may allow increased processing speed and/or throughput through the first saw module. The precut module typically includes one or more cutting members such as chip heads, profiling heads, or circular saws. The configuration of the cutting members and other components of the precut module may vary among embodiments.

In some embodiments, a precut module may have two, three, four, or more than four sections, and the cutting members may be distributed among two or more of the sections. Optionally, one or more sections may have feed rolls, positioning rolls/pins, or other such feed/positioning devices instead of, or in addition to, a cutting member. Precut modules with such multiple section configurations may be easier and less expensive to upgrade or reconfigure (e.g., by adding another section) to accommodate changes in log diet or market demand. A multiple section configuration may also allow one section to remain in use while another section is offline. However, the multiple section configuration is not intended to be limiting, and in other embodiments a precut module may have only one section. For example, in some precut modules two or more types of cutting members may be arranged within a single section rather than among multiple sections.

In various embodiments, a section of a precut module may have a pair of cutting members that are arranged on generally opposite sides of a flow axis (FIG. 1, dashed line) extending through the precut module. Paired cutting members may be repositionable independently of one another in some embodiments. Alternatively, some paired cutting members may be mechanically linked for synchronous positioning relative to the flow axis or other point of reference. Optionally, in some embodiments a section may have feed rolls or other feeding/positioning devices in addition to, or instead of, a cutting member.

Optionally, a section or its cutting member(s) may be configured to be laterally, vertically, and/or axially repositionable, pivotable around a vertical axis, and/or pivotable around a horizontal axis. In some embodiments a precut module may include a carriage that is selectively actuable to reposition one or more of the sections or cutting members. For example, a section may have a pair of cutting members supported on a corresponding pair of carriages 124 disposed on opposite sides of the center axis, and the carriages may be selectively movable toward and away from the flow axis along a rail 126 (see e.g., FIGS. 2A, 2B and 5A, 5B). Alternatively, two or more sections may be mounted to a common carriage or pair of carriages that are slideable along rails oriented parallel to, or perpendicular to, the flow axis. In other embodiments a precut module may include a frame that is selectively repositionable. For example, a section may have a frame 128 that is moveable along, and/or pivotable around, a vertical axis 130, a horizontal axis 132, and/or a pivot pin 134 (see e.g., FIGS. 3A, 4A). In still other embodiments, a section may have a frame that is configured to remain stationary and cutting member(s) that are selectively repositionable relative to the frame.

Figure 8:
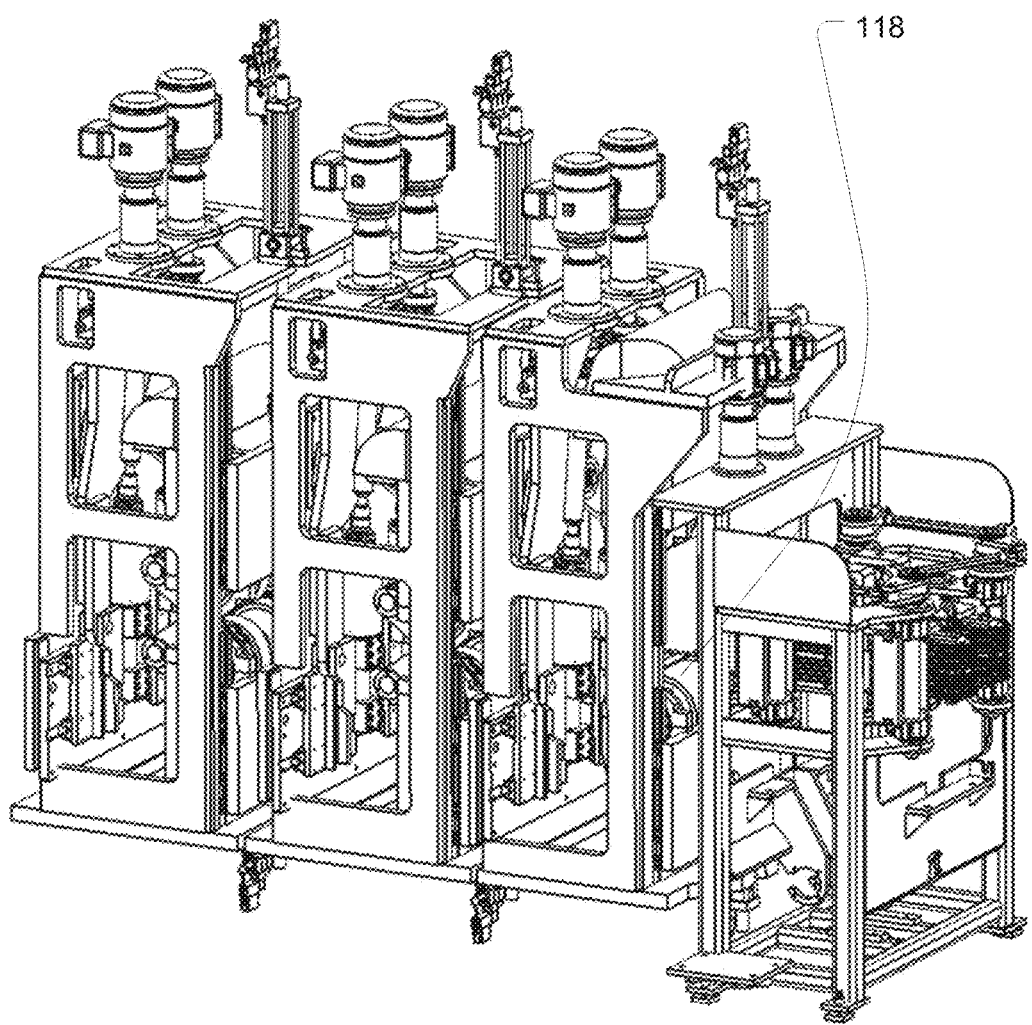
FIG. 8 illustrates a perspective view of another precut module configuration.

In some embodiments, multiple sections of a precut module may be arranged with little or no gap between them (see e.g., FIGS. 6-8). Optionally, two or more sections of a precut module may be mechanically coupled together, such as by a common frame, rail, support, conveyor, carriage, or other such component.

In various embodiments, some or all of the sections may be conventional chipper modules, profiler modules, or saw modules.

Referring again to FIG. 1, some embodiments may include a precut module 102 with three sections 102a, 102b, and 102c. Section 102a may be configured to form a generally planar face along one side or opposite sides (e.g., lateral sides and/or top and bottom) of a primary workpiece, such as a log or a cant. Section 102b may be configured to profile the generally planar faces or to cut partially through the primary workpiece longitudinally. Section 102c may also be configured to profile or cut partially through the primary workpiece.

In some embodiments, section 102a may include paired chip heads 118 (see e.g., FIGS. 2A, 8). Chip heads 118 may be conical chip heads, disc chip heads, drum chip heads, or any other suitable type of chip head. Chip heads 118 may be disposed on opposite lateral sides of the flow axis or above and below the flow axis. In some embodiments, section 102a may have two side chip heads, a top chip head, and a bottom chip head. Alternatively, some precut modules may include two sections 102a, one having lateral chip heads and the other having upper and lower chip heads. While the chip heads will typically be provided in pairs, some embodiments may have a section with only one chip head. In such embodiments, a corresponding chip head may be provided upstream or downstream of that section, or the processing line may be configured to move the primary workpiece through the section again in a different rotational position to form another generally planar face.

In other embodiments, section 102a may have one or more saws that are operable to form a generally planar face by cutting a slab from the log. For example, section 102a may have one or more band saws, paired circular saws, or other suitable types of saws.

Regardless, section 102a may be configured to open opposite faces along a log to produce a two-sided cant, and/or to open opposite faces along a two-sided cant to produce a four-sided cant. In various embodiments, section 102a may be a conventional chipper, slabber, or saw assembly. Some embodiments may have two sections 102a. Other embodiments may lack a section 102a.

In some embodiments, section 102b may have one or more pairs of profiling heads 136. Profiling heads 136 may be of any suitable type or configuration. In some embodiments, pairs of profiling heads 136 may be mounted on a pair of arbors 138. Arbors 138 may be horizontal arbors (see e.g., FIG. 3A, 6A-B, 8) or vertical arbors (see e.g., FIG. 5A), Optionally, some or all of the profiling heads 136 may be selectively repositionable along the corresponding arbors 138. Alternatively, profiling heads 136 may be fixed in position along arbors 138, and arbors 138 or section 102b may be selectively repositionable laterally, vertically, and/or around a vertical pivot axis. Collectively, profiling heads 136 may be configured to profile opposite faces of a primary workpiece 140 (see e.g., FIGS. 3A, 4A) such as a log or cant. In some embodiments, one or more of the profiling heads 136 may be stepped profiling heads operable to profile one or more side boards of a desired size along the primary workpiece.

In other embodiments, section 102b may have one or more presaws, such as circular saws 120, selectively operable to make cuts along the primary workpiece without cutting completely through the primary workpiece. Circular saws 120 may be mounted individually or in multiples on corresponding arbors 122. For example, section 102b may include a pair of upper circular saws 120 and a pair of lower circular saws mounted on a pair of arbors 122. Arbors 122 may be horizontal arbors (see e.g., FIG. 4A, 7A-B) or vertical arbors (see e.g., FIG. 5B). In some embodiments, some or all of the circular saws 120 may be selectively repositionable along the corresponding arbors 122. Alternatively, some or all of the circular saws 120 may be fixed in position along arbors 122, and arbors 122 and/or section 102b may be selectively repositionable laterally, vertically, and/or around a vertical pivot axis. Optionally, in some presaw modules, one arbor 122 may be positioned slightly upstream of another arbor 122.

Figure 2B:
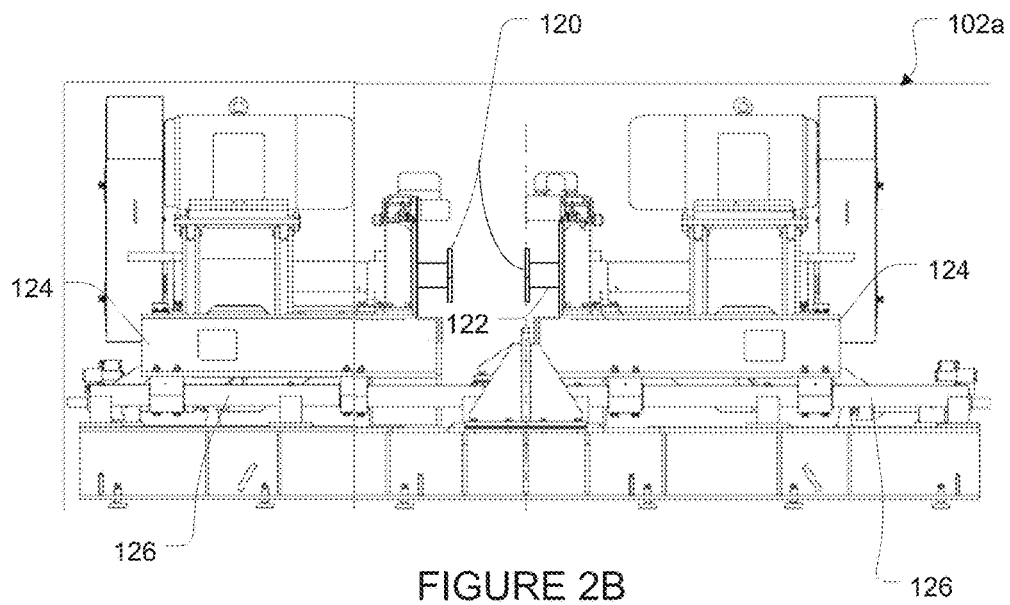
Figure 6A:
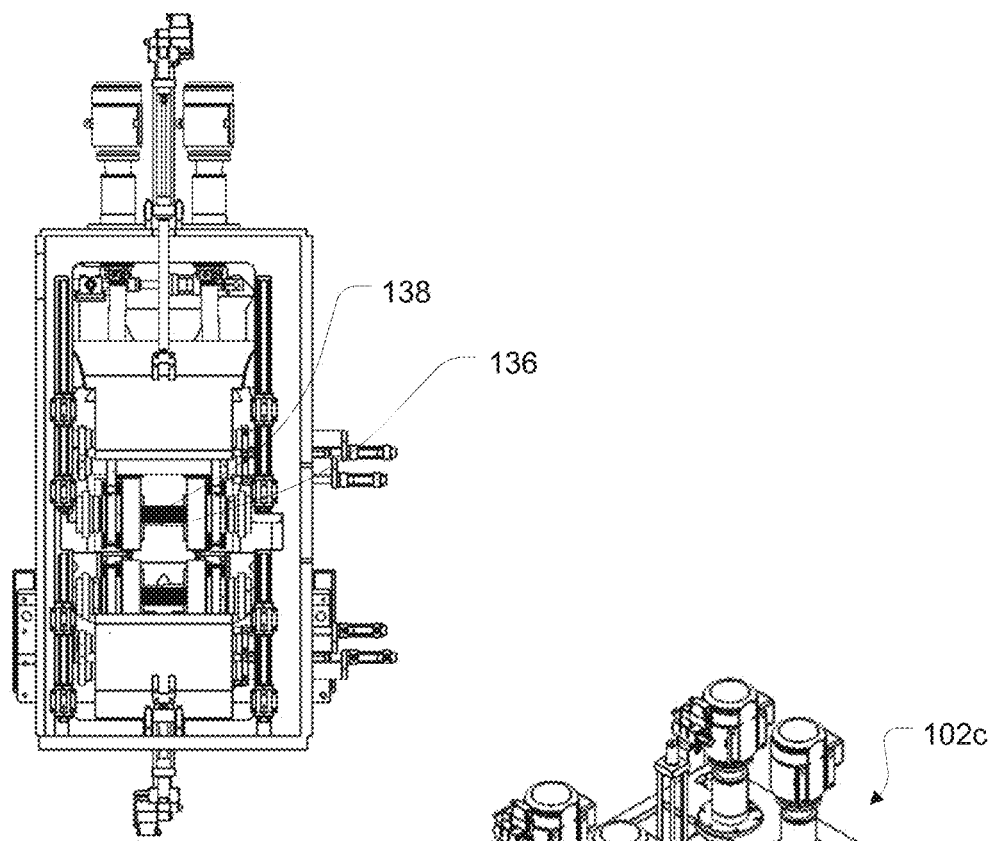
FIGS. 6A-6B illustrate front elevational and perspective views, respectively, of another profiler section configuration.
Figure 6B:
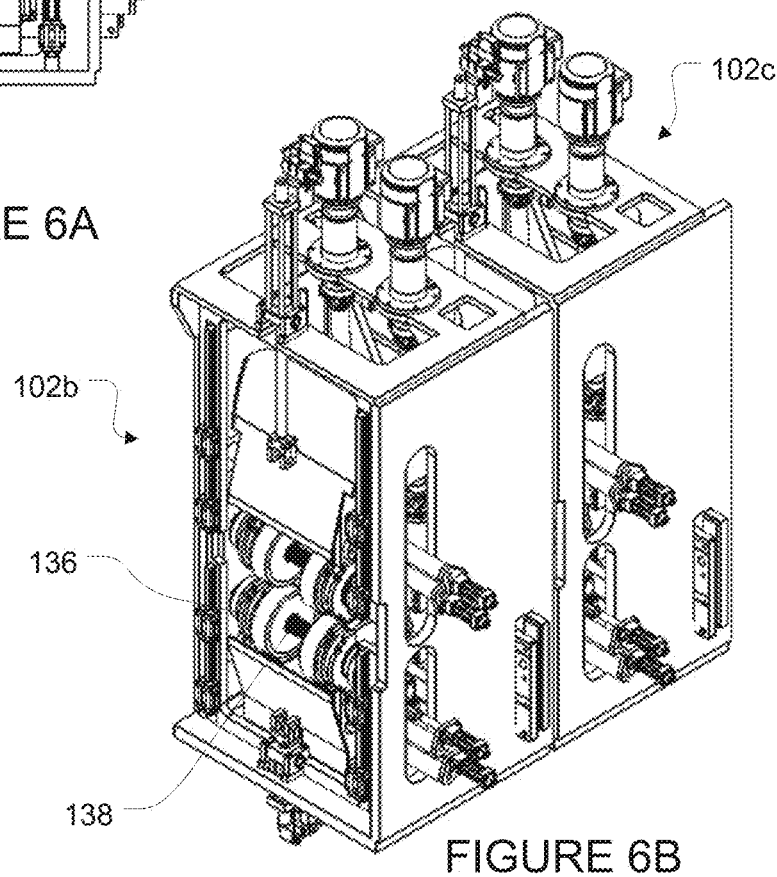
Figure 7A:
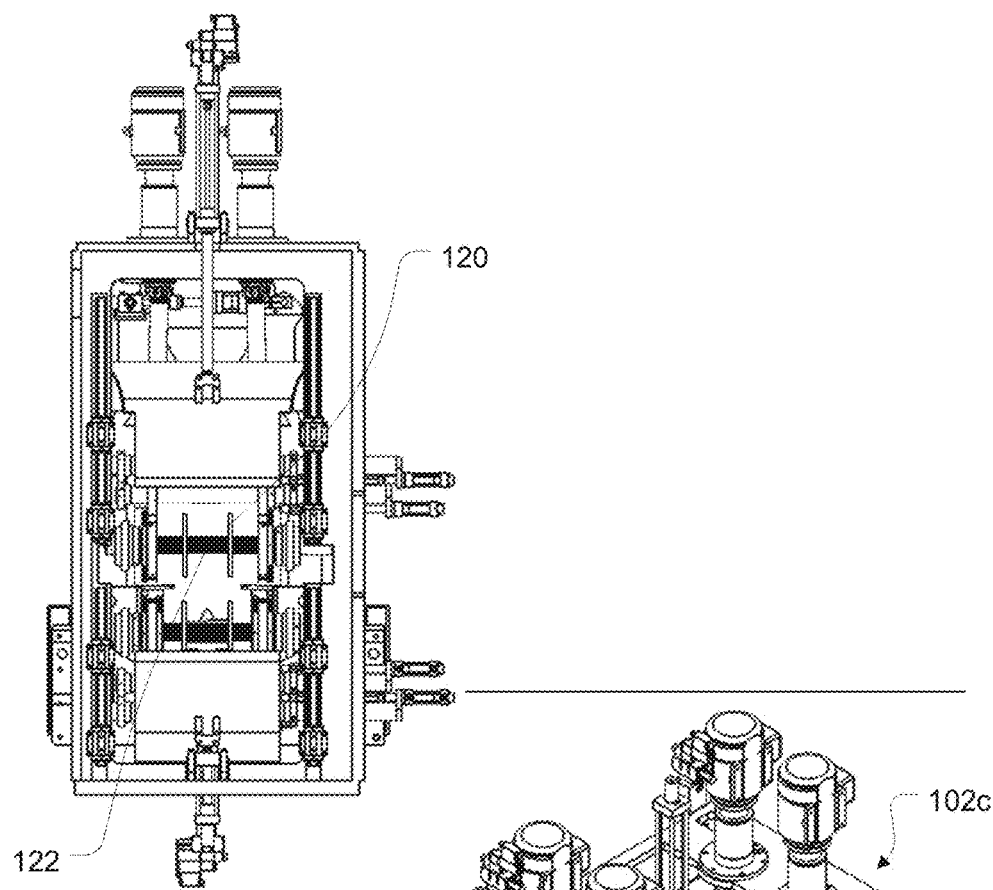
FIGS. 7A-7B illustrate front elevational and perspective views, respectively, of another precut saw section configuration.
Figure 7B:
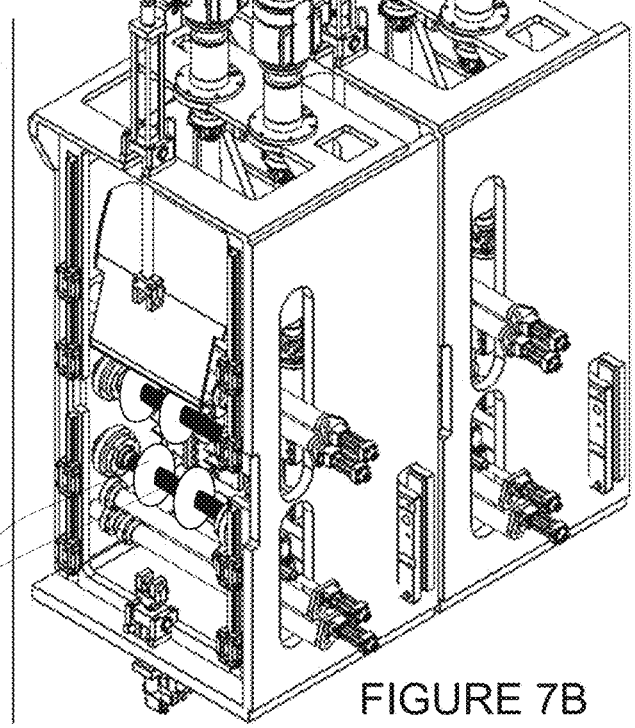

In some embodiments, circular saws 120 may be mounted individually or in multiples on separate arbors 122 that are positioned on opposite sides of the flow axis (see e.g., FIG. 2B). In a particular embodiment, arbors 122/138 may be configured to accommodate a profiling head and a circular saw interchangeably, such that the profiling heads can be removed from the arbors and substituted with circular saws or vice versa. Alternatively, section 102b or another section may be configured to accommodate both arbors 122 and arbors 138 to allow profiling heads to be substituted with circular saws and vice versa, or to accommodate both circular saws and profiling heads simultaneously. In some embodiments section 102b may have only one arbor 122 and/or only circular saw 120. In various embodiments, section 102b may be a conventional profiler unit or circular saw module.

Section 102c may also be configured to pre-cut the primary workpiece upstream of saw module 104. In some embodiments, sections 102b and 102c may be profiler modules collectively operable to profile an outer block or side board and an inner block or side board along the same side of the workpiece (see e.g., FIGS. 6A-B; see also FIG. 3C, showing a cut pattern for a dual profiler configuration). In other embodiments, sections 102b and 102c may be precut saw sections with corresponding circular saws collectively operable to cut partially through a workpiece along cut lines for an outer flitch and an inner flitch (see e.g., FIGS. 4A and 7A-B; see also FIG. 4C, showing a cut pattern for a dual presaw configuration). Alternatively, section 102b may include a profiler and section 102c may include one or more circular saws, or vice versa. In some embodiments, section 102c may be a conventional profiler or circular saw module. Other embodiments may lack section 102c.

First Saw Module

Figure 9A:
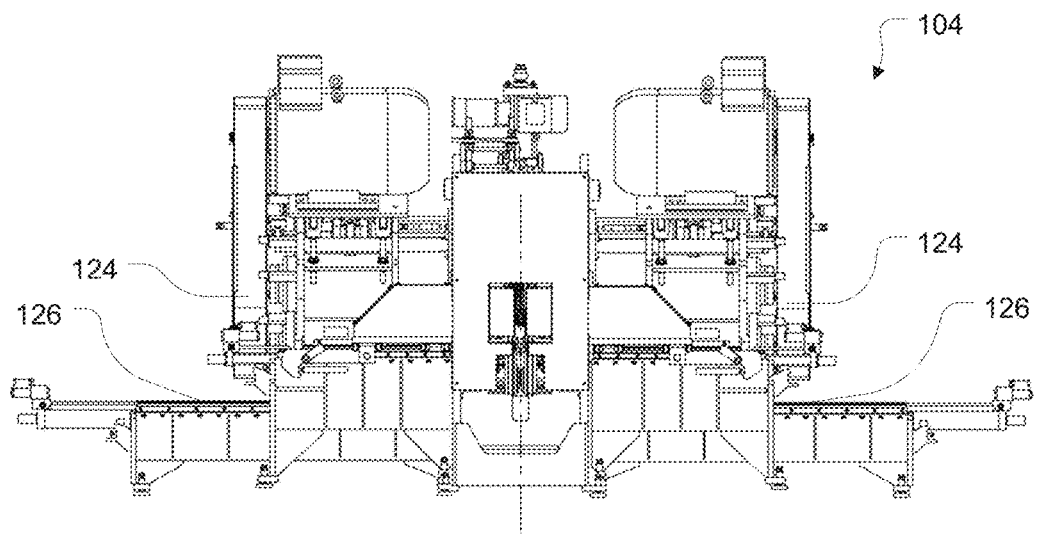
FIGS. 9A-9B illustrate front elevational and side elevational views, respectively, of a saw module.
Figure 9B:
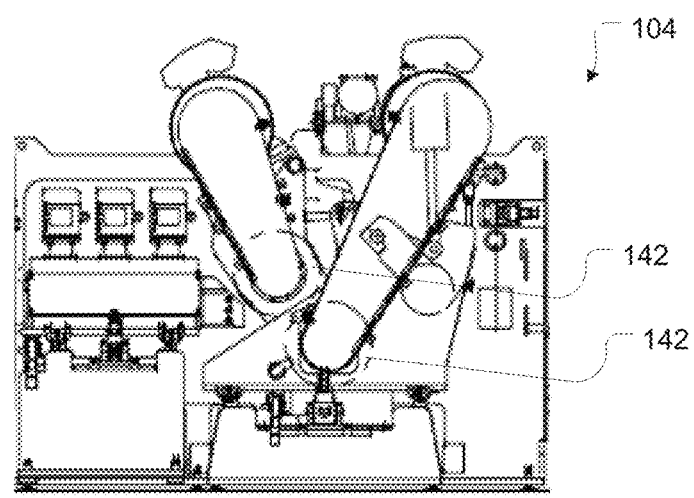

Referring again to FIG. 1, first saw module 104 may include one or more band saws, circular saws, or gang saws, alone or in any suitable combination. Examples of suitable saw modules include, but are not limited to, shape/curve saws, shape/curve sawing gang saws, straight sawing gang saws, and single, dual, and quad band saw systems. In some embodiments, first saw module 104 may be a quad arbor saw that includes circular saw blades arrayed along upper and lower horizontal arbors (FIGS. 9A-B). Optionally, the quad arbor saw may have a pair of shifting saw carriages with a fixed bottom arbor and a tilting top arbor configured to equalize the depth of cut among the saws on the arbors. In other embodiments, first saw module 104 may be a quad band saw. Again, first saw module 104 may have any suitable configuration, and the number and type of saws will vary among embodiments.

Figure 10:
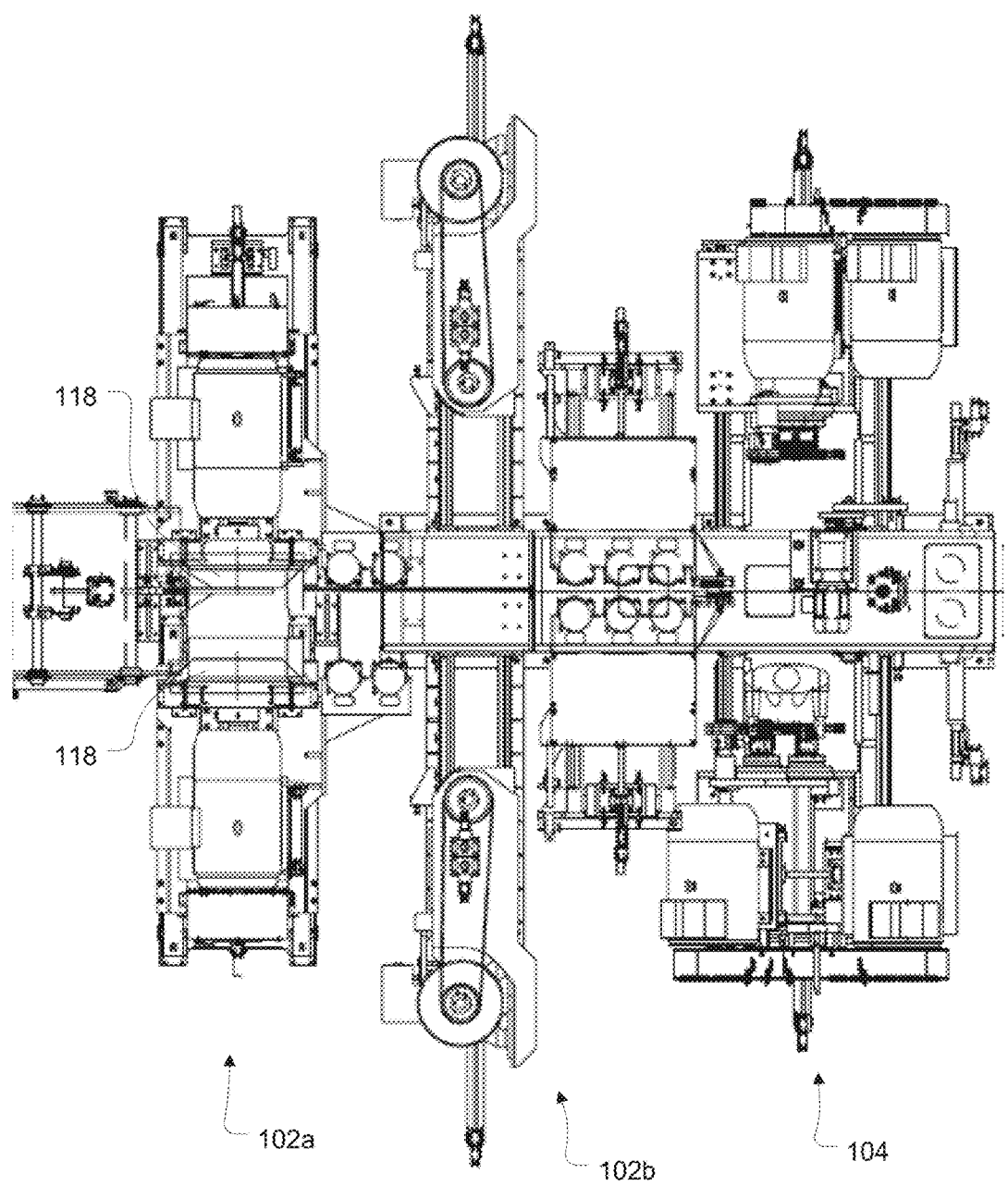
FIG. 10 illustrates a plan view of a primary breakdown system configuration that includes a precut module with a chipper section and a profiler/precut saw section.
Figure 11:
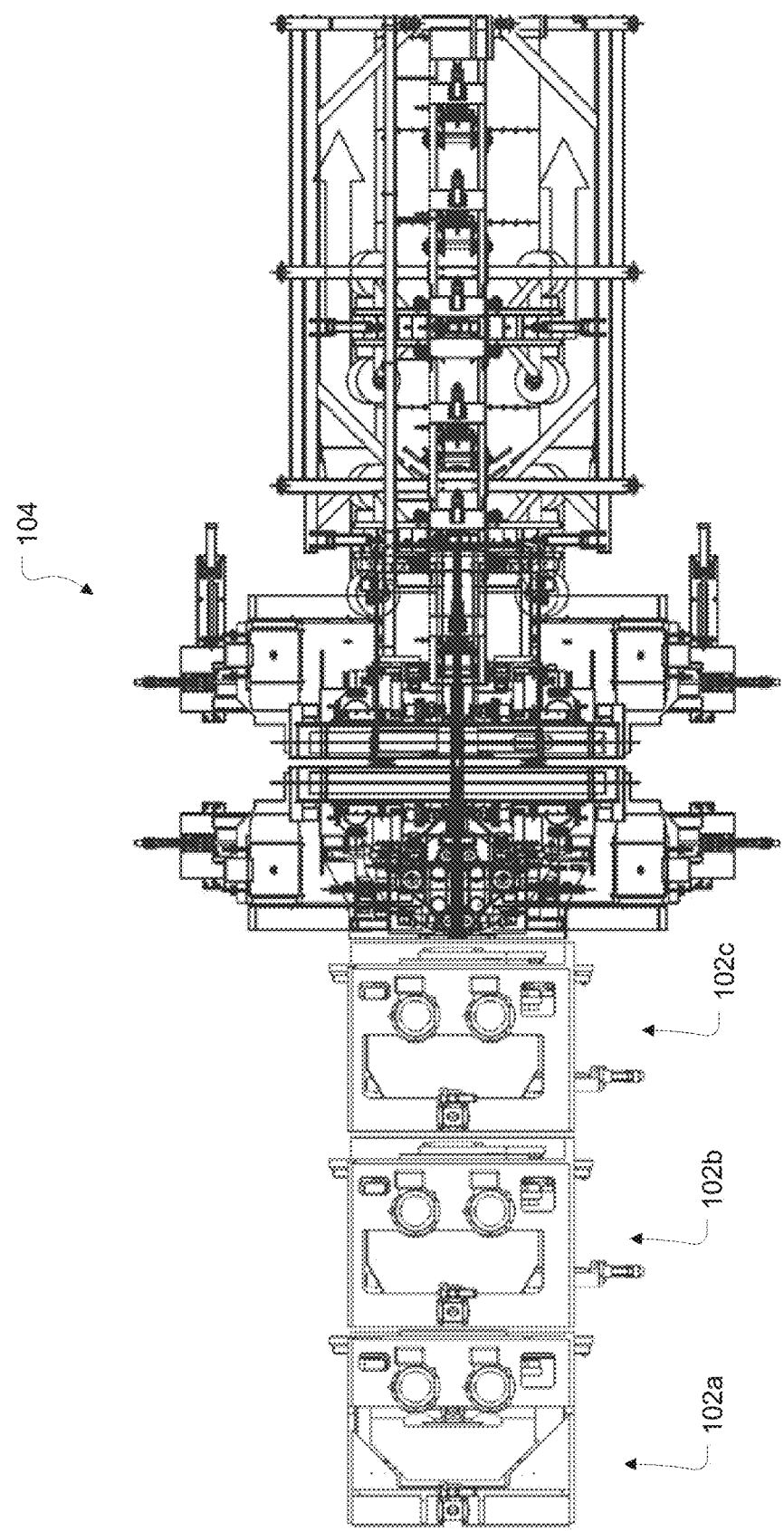
FIG. 11 illustrates a plan view of another primary breakdown system configuration that includes a precut module with a chipper section and two profiler/precut saw sections.
Figure 12:
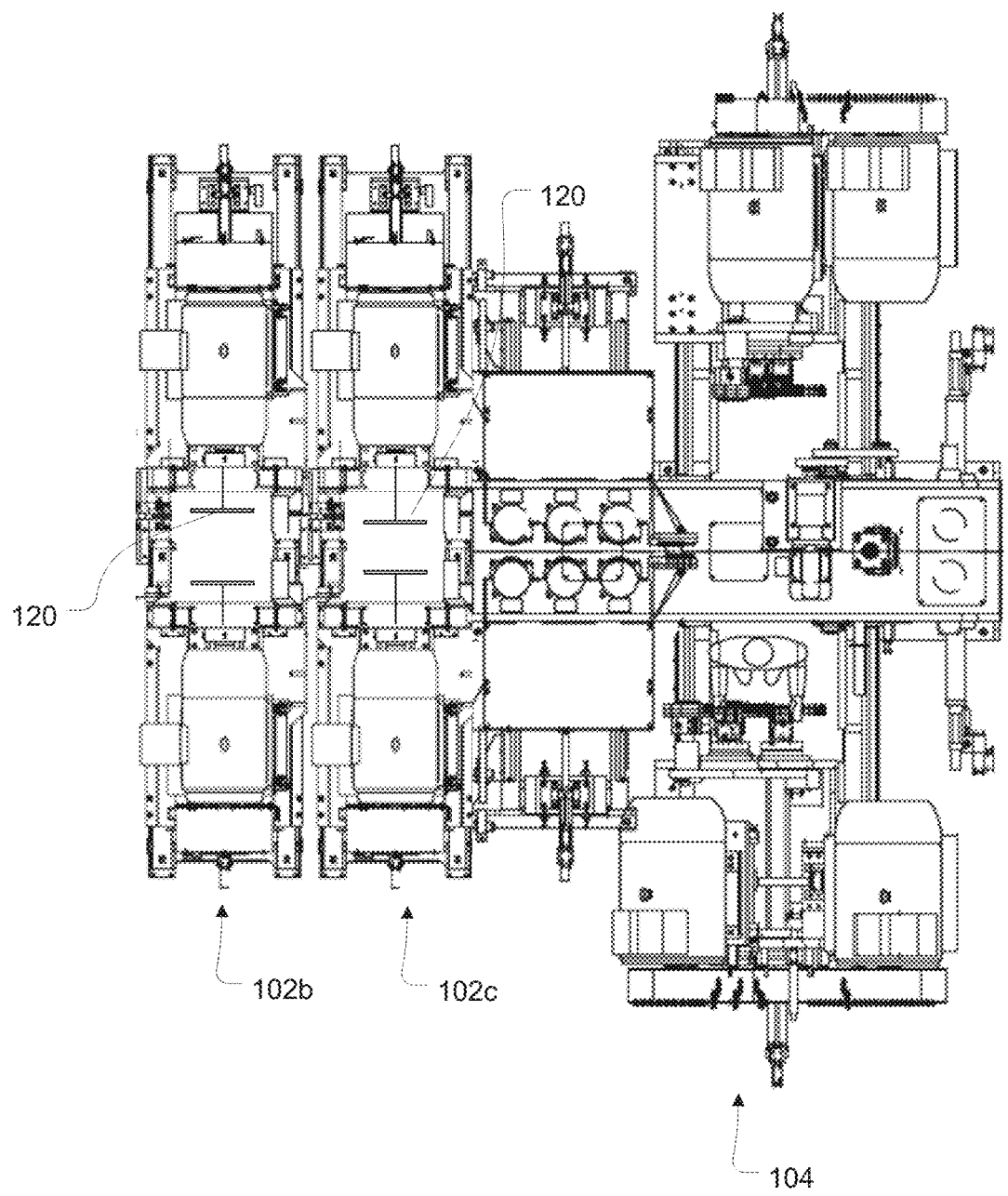
FIG. 12 illustrates a plan view of a primary breakdown system configuration that includes a precut module with two precut saw sections.
Figure 13:
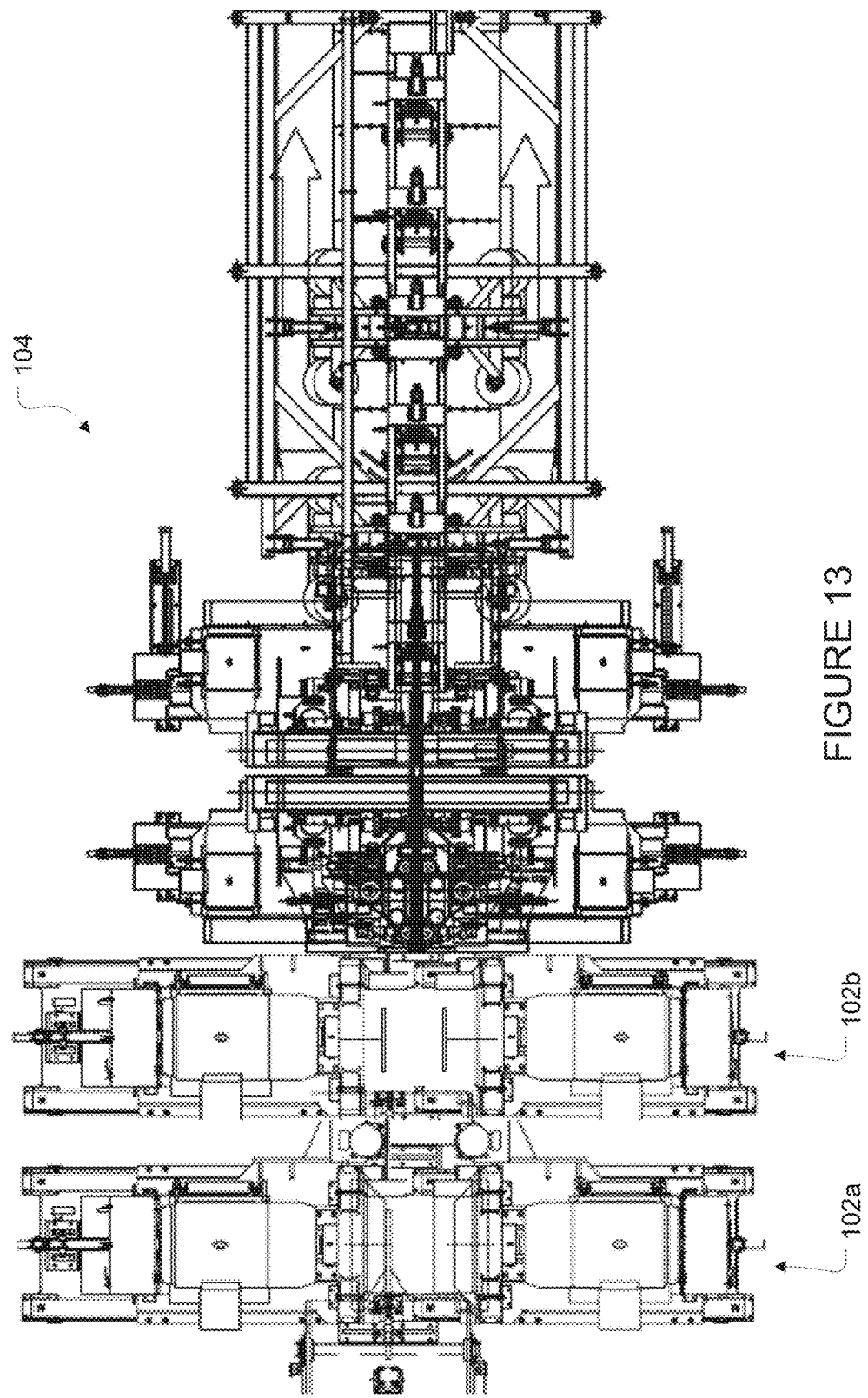
FIG. 13 illustrates a plan view of a primary breakdown system that includes a precut module with a chipper section and a precut saw section.

FIGS. 10-13 illustrate examples of primary breakdown systems that include a precut module upstream and a first saw module arranged in various configurations, in accordance with embodiments. In the example of FIG. 10, precut module 102 includes a section 102a with paired chip heads 118 and a section 102b with a profiler configured to profile an outermost side board, and first saw module 104 includes a quad arbor saw. In the example of FIG. 11, precut module 102 includes a section 102a with paired chip heads or a profiler, and second and third sections 102b and 102c with corresponding profiling heads, and first saw module 104 includes a band saw. In the example of FIG. 12, precut module 102 includes a section 102a and a section 102b, each with a corresponding precut saw assembly that includes one or more circular saws, and first saw module 104 includes a quad arbor saw. In the example of FIG. 13, precut module 102 includes a section 102a with paired chip heads 118 and a section 102b with one or more circular saws, and first saw module 104 includes a quad arbor saw. These examples are provided merely by way of illustration, and are not intended to be limiting. The skilled artisan in possession of the present disclosure will readily appreciate many other substitutions, alternatives, arrangements, combinations, and configurations that are suggested by the descriptions and illustrations of the specific examples disclosed herein.

Conveyors and Additional Saw Modules

Referring again to FIG. 1, conveyor 106/108 may include any suitable type of conveyor. Examples include, but are not limited to, sharp chain conveyors, flighted chain conveyors, smooth chain/belt conveyors, driven feed rolls, and the like, alone or in any suitable combination. Optionally, conveyor 106 may be configured to raise, lower, skew, slew, and/or tilt a primary workpiece engaged by, or upstream of, precut module 102 and/or first saw module 104. Likewise, in some embodiments conveyor 108 may be configured to raise, lower, skew, slew, and/or tilt a cut product engaged by, or upstream of, second saw module 110. In some embodiments, conveyor 106 and/or conveyor(s) 108 may each independently include one, two, or more than two conveyors.

Second saw module 110 may be configured to make one or more longitudinal cuts in a workpiece. In some embodiments, second saw module 110 may be, or may include, an edger. The edger may be a gang edger, a shifting edger, or any other suitable type of edger. Some processing lines may have more than one second saw module 110 (e.g., two edgers). Other processing lines may have only one second saw module 110.

Third saw module 112 may include one or more band saws, circular saws, or gang saws, alone or in any suitable combination. In various embodiments, third saw module 112 may be positioned downstream of the first saw module 104 and operable to saw cants into boards. Some embodiments may lack third saw module 112.

Fourth saw module 114 may be configured to make one or more transverse cuts in a workpiece. In some embodiments, fourth saw module 112 may be a trimmer. Other embodiments may lack a fourth saw module 112. Any or all of conveyors 106/108, second saw module 108, third saw module 112, and/or fourth saw module 114 may be conventional machinery arranged in any suitable manner.

Scanner/Optimizer System

In various embodiments, scanner/optimizer system 116 may include a computing device 116b and/or a sensor 116a (FIG. 1). Sensor 116a and computing device 116b may be integrated within a single device in some embodiments. In other embodiments, sensor 116a and computing device 116b may be separate devices that are operatively coupled together. Similarly, computing device 116b may include either a single device or multiple devices, and sensor 116a can include either a single sensor or multiple sensors. Sensor 116a may include one or more optical/vision, mechanical, electrical, electronic, photoelectric, capacitive, ultrasound, microwave: radio frequency, X-ray, acoustic/vibration, proximity, or other suitable sensor types, alone or in any combination. Sensor 116a can include a non-contact sensor, a contact sensor, or some combination thereof. In some embodiments sensor 116a is, or includes, a 3D scanner. Examples of suitable sensors 116a include, but are not limited to, cameras, time-of flight 3D laser scanners, triangulation 3D scanners, and computed tomography (CT) scanners. In other embodiments, workpiece processing system 100 may lack scanner/optimizer system 116.

In various embodiments, scanner/optimizer system 116 may be operatively coupled to precut module 102 and/or first saw module 104. Optionally, scanner/optimizer system 116 may also be operatively coupled to any or all of the other saw modules 108/112/114 and/or conveyors 106/108. In various embodiments, scanner/optimizer system 116 may be programmed to perform (or control other devices to perform) various operations of any or all of the methods described herein. For example, scanner/optimizer system 116 may be programmed to generate instructions for use by a PLC or other type of controller to set or adjust a speed or position of precut module 102, first saw module 104, second/third/fourth saw module 111/113/114, conveyor 106/108, and/or one or more components thereof, such as cutting members or positioning members.

Scanner/optimizer system 116 may be configured to scan a workpiece and determine an optimized cut solution for the workpiece based at least on the scan data. In some cases, it may be possible to implement a given cut solution according to any one of several groups of cut patterns to obtain the desired cut product(s) from a workpiece. Each group of cut patterns may provide a unique combination of parameters that influence throughput speed and/or wood volume recovery. Examples of such parameters include, but are not limited to, a required depth of cut, the sequential order in which cuts are made, the type and sequential order of the machine centers/cutting members designated to make the cuts, the number and/or dimensions of the intermediate/final cut products, and the shape of the intermediate cut products (e.g., straight-edged or wane-edged). Other parameters may also be considered in calculating, or in determining a value of, a cut solution or group of cut patterns. Examples include, but are not limited to, monetary value of the final cut products, length of time required to reposition a cutting member for cutting a subsequent or preceding workpiece, the shape of the intermediate cut products (e.g., straight-edged or wane-edged), the maximum throughput speed of individual machine centers, predicted or actual current throughput speeds through individual machine centers, predicted or actual backlogs along the processing line, and cut solutions or cut patterns of other workpieces further upstream.

The number of possible cut patterns for a given cut solution may depend at least in part on the number and types of machine centers available for use to implement the cut solution(s). There may also be alternative cut solutions for the workpiece, and corresponding groups of cut patterns for each cut solution. Therefore, scanner/optimizer system 116 may also be configured to calculate alternative cut solutions and to calculate cut patterns based at least on the corresponding cut solutions.

In some embodiments, scanner/optimizer system 116 may be configured to calculate a single group of cut patterns based on a cut solution and one or more parameters. For example, scanner/optimizer system 116 may be configured to calculate a group of cut patterns for a workpiece based at least on a desired depth of cut at the first saw center 104, a desired wood volume recovery, or a desired throughput speed/volume. Optionally, scanner/optimizer system 116 may be configured to calculate the group of cut patterns based on two or more parameters.

Alternatively, scanner/optimizer 116 may be configured to calculate multiple groups of cut patterns for a given cut solution, determine a benefit of one of the cut patterns relative to the other(s), and select one of the groups of cut patterns for implementation based on the benefit. For example, if the goal is to maximize throughput through the saw center, determining the benefit may involve determining which of the groups of cut patterns requires the smallest depth of cut at the saw center. The benefit may also be determined based on multiple parameters. For example, the groups of cut solutions may be assessed to determine which of the groups offers the greatest wood volume recovery for a predefined throughput speed, or the greatest throughput speed for a predefined wood volume recovery. Optionally, the scanner/optimizer system 116 may be configured to rank the groups of cut patterns according to a combination of factors and select the highest or lowest ranking group of cut patterns for implementation.

In various embodiments, scanner/optimizer system 116 may be configured to cause the corresponding machine centers to implement the calculated/selected group of cut patterns. For example, scanner/optimizer system 116 may be configured to control the machine centers directly, and/or to generate and send the cut patterns and/or commands to controllers (e.g., programmable logic controllers) that control the position, speed, and/or various operations of the machine centers.

Example 1

Embodiments of the present disclosure may be implemented in a variety of ways in sawmills and other wood processing facilities. The following describes, by way of explanation, various operations of a workpiece processing system with reference to FIGS. 1 and 14A-H. However, the present disclosure will suggest numerous alternatives and modifications to the skilled artisan in addition to those that are explicitly described, and the example is not intended to be limiting.

In this example, a workpiece processing system 100 includes a precut module 102, a first saw module 104 disposed downstream of the precut module 102, and at least a second saw module 108 disposed downstream of the first saw module 104. The second saw module 108 has at least one edger. Precut module 102 includes a section 102a with side chippers or saws that are operable to open flat faces along the primary workpiece, and a section 102b with profiling heads. Precut module 102 may or may not include a section 102c with profiling heads or circular saws. The workpiece processing system 100 also includes a scanner/optimizer system 116 operatively coupled to the precut module 102, first saw module 104, and second saw module 108.

In operation, the primary workpiece is scanned by the scanner/optimizer system 116 upstream of precut module 102 to obtain dimensional data and other information about the primary workpiece (e.g., the size and location of defects). The scanner/optimizer system 116 calculates at least one cut solution for the primary workpiece based at least on the scan data. For example, FIG. 14A illustrates a cut solution 142 that defines predicted side boards 144 and center boards 146 to be cut from the primary workpiece along predicted cut lines (dashed lines of FIG. 14A). The inner and outer faces of the predicted side boards 144 are defined by predicted cut lines 150 and 148, respectively, and the longitudinal sides of the predicted side boards are defined by predicted cut lines 154. While one possible cut solution is illustrated by way of explanation, in some embodiments scanner/optimizer system 116 may calculate multiple cut solutions that define different predicted cut products. Optionally, scanner/optimizer system 116 may calculate the cut solution(s) based at least in part on one or more defined parameters, as discussed herein.

Some predicted cut lines may define through-cuts through the primary workpiece (i.e., cuts that extend through two surfaces of the primary workpiece). In this example, predicted cut lines 148 and 150 define through-cuts through the primary workpiece. In some cases, a through-cut defined by a predicted cut line may be one of several possible options for implementing the predicted cut line. For example, as predicted cut line 150 extends through two opposite surfaces of the primary workpiece, it would typically be implemented by cutting through the primary workpiece. But predicted cut line 148 does not extend fully through the primary workpiece. As such, it could be implemented by section 102a as a through-cut through the primary workpiece (see FIG. 14B). Or, if the workpiece processing system includes a reman head downstream of the first saw center 104, predicted cut line 148 could be implemented by the reman head instead of as a through-cut through the primary workpiece. Thus, a predicted cut line can define a through-cut through a particular workpiece even if it could be implemented in some other manner.

The scanner/optimizer system 116 calculates at least one group of cut patterns for implementing the cut solution. Again, the scanner/optimizer system 116 may do this in any of several different ways—by calculating a single group of cut patterns based on the cut solution and one or more profitability-related parameter(s), or by calculating multiple groups of cut patterns for one or more corresponding cut solutions and selecting one of the groups for implementation (e.g., based on one or more profitability-related parameters). If multiple groups of cut patterns are calculated, each group may represent a different strategy and/or a different combination of machine centers for implementing a given portion of the cut solution. The groups may, but need not, include cut patterns that are common to all of the groups (i.e., those for which no alternatives are calculated).

In this example, scanner/optimizer system 116 calculates a cut pattern for implementation by first precut unit 102a to open faces along opposite sides of the workpiece and remove extraneous material 152a (FIGS. 14A-B, cut lines 148) to form a cant.

The scanner/optimizer system 116 also calculates several groups of cut patterns (Group A, Group B, and Group C) that represent different strategies for cutting the cant along the predicted cut lines (150 and 154) to obtain the side boards. Each group of cut patterns is configured for implementation by a different combination of machine centers:

1. Group A (FIG. 14C): This group of cut patterns includes (1) a cut pattern for implementation by first saw module 104 to cut the cant along predicted cut lines 150, yielding two flitches and a center cant; and (2) a cut pattern for implementation by second saw center 108 to cut the flitches along predicted cut lines 154, yielding two side boards 144 and extraneous material 152b.
2. Group B (FIG. 14D): This group of cut patterns includes (1) a cut pattern for implementation by second precut unit 102b to cut the cant along predicted cut lines 154 and portion 150a of predicted cut lines 150 and remove extraneous material 152b, thereby forming the profiles of the side boards 144; and (2) a cut pattern for implementation by first saw module 104 to cut the workpiece along the remaining portion 150b of predicted cut lines 150 to release the side boards 144 from the remaining center cant.
3. Group C (FIG. 14E): This group of cut patterns includes (1) a cut pattern for implementation by second precut unit 102b to cut the cant along cut lines 156 and portion 150c of predicted cut lines 150 to remove extraneous material 152c, thereby forming the profiles of blocks 158 that are wider than the side boards 144; (2) a cut pattern for implementation by first saw module 104 to cut the workpiece along the remaining portion 150d of predicted cut lines 150 to cut the blocks 158 from the workpiece; and (3) a cut pattern for implementation by second saw center 108 to cut the blocks 158 along predicted cut lines 154, yielding two side boards 144 and extraneous material 152d.

As will be readily apparent to those skilled in the art, many other alternatives may be possible depending in part on the configuration of the processing line. For example, if second saw center 108 includes a reman head, a fourth group of cut patterns might include a cut pattern for implementation by first saw center 104 to cut slabs from the workpiece along cut lines 150, a cut pattern for implementation by second saw center 108 to cut the slabs along predicted cut lines 154, and a cut pattern for implementation by the reman head to cut the slabs along predicted cut lines 148. (In that case, Groups AC may include the cut pattern calculated for implementation by the first precut section 102a to open faces along the workpiece, and the fourth group of cut patterns may not include that cut pattern.)

The scanner/optimizer system 116 determines a value of each group of cut patterns in terms of wood volume recovery, throughput speed, and/or one or more other parameters. For instance, if the edger can cut a side board with greater accuracy/precision than the profiler, scanner/optimizer system 116 may determine that Groups A and C have greater values than Group B in terms of wood volume recovery. If the profiler is faster than the edger, scanner/optimizer system 116 may determine that Groups B and C have greater values that Group A in terms of throughput. The scanner/optimizer system 116 may determine separate values for each of several factors, or determine a value based on one parameter and adjust the value based on another parameter.

In some embodiments, scanner/optimizer system 116 may determine, for each group of cut patterns, a corresponding throughput speed through a given machine center or portion of the processing line. The machine center may have a range of depths of cut, and a known or predicted throughput speed for each depth of cut within the range. Thus, throughput speed through the machine center may be predicted for a given cut pattern by determining the depth of cut required by that cut pattern at that machine center and using the determined depth of cut to identify the corresponding throughput speed for that machine center.

Scanner/optimizer system 116 may determine the depth of cut required by a cut pattern based at least on the cut solution, corresponding cut pattern(s), and/or dimensional information about the primary workpiece. In other cases, scanner/optimizer system 116 may determine the depth of cut based on input from a human operator entered via a keyboard, touchscreen, or other type of interface.

In some cases, scanner/optimizer system 116 may determine the depths of cut required at a particular machine center by two or more alternative cut patterns for that machine center. In this example, each of the groups of cut patterns A, B, and C include a corresponding cut pattern for first saw module 104 that defines a cut to be implemented by first saw module 104 (see FIGS. 14C-E, predicted cut line 150 and portions 150*b*, 150*d*). Thus, scanner/optimizer system 116 determines a depth (see arrows of FIGS. 14C-E) of each of these defined cuts.

Scanner/optimizer system 116 may use the determined depth of cut, and the relationship between cut depth and speed for that machine center, to predict a throughput speed for the corresponding cut pattern or group of cut patterns. The relationship may be particular to that saw module, or it may apply more generally to saw modules of a given type (e.g., band saw modules, gang saw modules, etc.). An example of such a relationship is shown below in Table 1:

TABLE 1

| Depth of cut (inches) | Throughput speed (feet per minute) |
|---|---|
| 10-12 | 450 |
| 8-10 | 550 |
| 7-8 | 600 |
| 6-7 | 610 |
| up to 6 | 620+ |

In some embodiments, such relationship information may be stored locally on scanner/optimizer system 116 or stored externally (e.g., on a remote database, cloud, etc.), as a look-up table or other suitable type of record. Optionally, scanner/optimizer system 116 may be programmed to create or adjust the relationship information by monitoring operations of the saw module (e.g., cutting member speed, cut depth, throughput speed) in real time and associating the monitored parameters with one another. For example, scanner/optimizer system 116 may be programmed to determine an actual throughput speed of first saw module 104 during an increment of time, determine the actual depth of cut of first saw module 104 during the same increment of time, store the two values in association with one another in the form of a look-up table or other record, and retrieve the values at a later time (e.g., by searching recorded values for a particular throughput speed or depth of cut).

In any case, scanner/optimizer system 116 may use the relationship information to identify the throughput speed that corresponds to the determined depth of cut for a given cut pattern. In this example, scanner/optimizer system 116 may determine that the depths of cut for predicted cut lines 150 and portions 150*b* and 150*d* are 12 inches, 6 inches, and 7 inches, respectively. Scanner/optimizer system 116 may access the relationship information in Table 1 and use the determined depths of cut to identify the corresponding throughput speeds. Thus, scanner/optimizer system 116 may determine that Groups A, B, and C have throughput speeds of 450 fpm, 610 fpm, and 610 fpm, respectively, through first saw module 104. Predicted throughput speeds may be determined in a similar manner for other machine centers.

Optionally, each predicted throughput speed may be used to calculate, or to adjust, the value of the corresponding group of cut patterns. In some embodiments each predicted throughput speed may be expressed as a cost, or as a benefit. For example, the group of cut patterns with the fastest throughput speed (e.g., through first saw module 104) may be assigned a throughput cost of zero, the group with the slowest throughput speed may be assigned the highest throughput cost, and any other groups may be assigned throughput speeds between that value and zero. Optionally, scanner/optimizer system 116 may identify a desired cut depth for a given saw module (e.g., first saw module 104) and eliminate or reduce the value of any group of cut patterns that requires a deeper cut at that saw module. Alternatively, as explained further below in Example 2, scanner/optimizer system 116 may determine the depth of a predicted cut and a desired cut depth for a particular machine center, and calculate cut patterns based at least on those values.

Cut patterns for preceding/subsequent workpieces may also affect throughput speed through the first saw module 104, and in some embodiments scanner/optimizer system 116 may consider them in the process of selecting, or assigning a value to, a group of cut patterns for a particular workpiece. For example, if the cut patterns for several consecutive workpieces upstream of the workpiece also require cuts at the edger, the value of Group B may be increased (or the value of Groups A and C reduced) to reflect a predicted backlog or slowdown at the edger.

Optionally, scanner/optimizer system 116 may determine the value of a group of cut patterns in monetary terms. Referring to the example above, if Group A is predicted to yield final cut products worth $420 at a cost of $25 in terms of throughput, Group B is predicted to yield final cut products worth $400 at no cost in terms of throughput, and Group C is predicted to yield final cut products worth $420 at no cost in terms of throughput, Group C may be selected as the most profitable group. But if the scanner/optimizer system 116 detects or predicts a slowdown at the edger and determines that the slowdown increases the cost of Group B to $25 in terms of throughput, scanner/optimizer system 116 may adjust the value of Group C and select Group B as the most profitable group. Thus, the most profitable option for a given workpiece is not necessarily the one that produces the most valuable final cut products or the greatest throughput, but one that offers the best combination of costs and benefits.

Example 2

The above Example described the use of the relationship between throughput speed and cut depth to determine throughput speeds of multiple groups of cut patterns. In contrast, this Example describes the use of cut depth and throughput speed to calculate a group of cut patterns.

In this example, workpiece processing system 100 is configured generally as described in Example 1, except that section 102b of precut module 102 includes circular saws 120 instead of profiling heads 136. However, the operations and methods described in these Examples are not limited to the described configurations of workpiece processing system 100. For instance, multiple groups of cut patterns can be calculated and assessed for profitability (e.g., based on throughput speed) as described in Example 1 whether section 102b of the precut module has profiling heads, circular saws, or both. Likewise, a group of cut patterns can be calculated based on a desired cut depth for a given saw module whether section 102b of the precut module has profiling heads, circular saws, or both. Other modifications to the configuration and operations are readily apparent to those skilled in the art and encompassed by the present disclosure.

In operation, the primary workpiece is scanned by the scanner/optimizer system 116 upstream of precut module 102 to obtain the dimensions/shape of the primary workpiece. The scanner/optimizer system 116 calculates at least one cut solution for the primary workpiece based on the scan data. Referring again to FIG. 14A, in this example the cut solution 142 and predicted cut products (side boards 144 and center boards 146) are generally as described in Example 1, and predicted cut lines 148 and 150 define through-cuts through the primary workpiece.

Scanner/optimizer system 116 may identify a desired depth of cut or desired processing speed for first saw center 104. In some embodiments scanner/optimizer system 116 may determine the desired depth of cut and/or processing speed based on input from a human operator. For example, a human operator may use a keyboard, touchscreen, or other type of interface to input the desired processing speed and/or throughput speed.

Optionally, scanner/optimizer system 116 may be configured to determine the desired depth of cut and/or processing speed based on one or more parameters. Such parameters include, but are not limited to, a predicted throughput speed of one or more other machine centers upstream or downstream of first saw center 104, size of gaps between workpieces, time required to reposition circular saws 120 between workpieces, time required time to reposition saw(s) of first saw center 104 between workpieces, positioning range of saws 120/saws of first saw center 104, physical characteristics of the workpieces (e.g., dimensions, species, hardness, moisture content), monetary factors (e.g., log cost, market price of predicted cut products), and mechanical constraints of first saw module 104 (e.g., the relationship between throughput speed and depth of cut, maximum skew/slew angles, maximum saw speed, flexibility of cutting members, lubrication/cooling requirements, and the like), alone or in any combination.

In some embodiments, scanner/optimizer system 116 may identify the desired depth of cut or throughput speed based at least in part on a relationship between throughput speed and depth of cut, as described above with regard to Example 1. Again, information about the relationship may be stored on, or otherwise accessible to, scanner/optimizer system 116.

Scanner/optimizer system 116 may calculate at least one group of cut patterns for the workpiece based on the cut solution and the desired cut depth/speed. The cut solution may require a through-cut through the primary workpiece. However, unlike conventional methods in which the through-cut would be made by a single saw module (see e.g., FIG. 14F, predicted cut line 150), scanner/optimizer system 116 may calculate the cut patterns in order to distribute the through-cut among two or more saw modules.

In some embodiments, scanner/optimizer system 116 may determine a desired depth of cut for a given saw module and calculate a cut pattern for the saw module to implement a portion of the through-cut such that the saw module does not exceed the desired depth of cut. Scanner/optimizer 116 may calculate another cut pattern for implementation by another saw module upstream or downstream of the given saw module to implement the remaining portion of the through-cut.

In this example, a desired throughput speed of 600 feet per minute (fpm) through first saw module 104 is input by a human operator. Scanner/optimizer system 116 accesses information about the relationship between cut depth and throughput speed for first saw module 104 (e.g., Table 1) to identify the corresponding depth of cut, which is 6-7 inches. Based at least on this desired depth of cut, scanner/optimizer system 116 calculates a group of cut patterns to implement the cut solution 142. Optionally, scanner/optimizer system 116 may also determine a total depth of cut for predicted cut line 150 (FIG. 14F, double ended arrow).

Figure 14H:
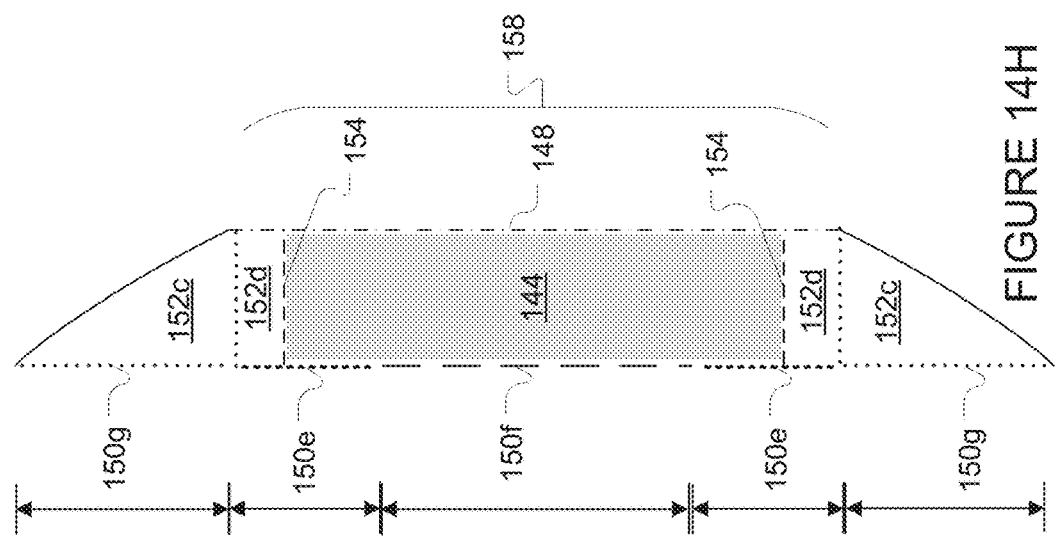
Figure 14G:
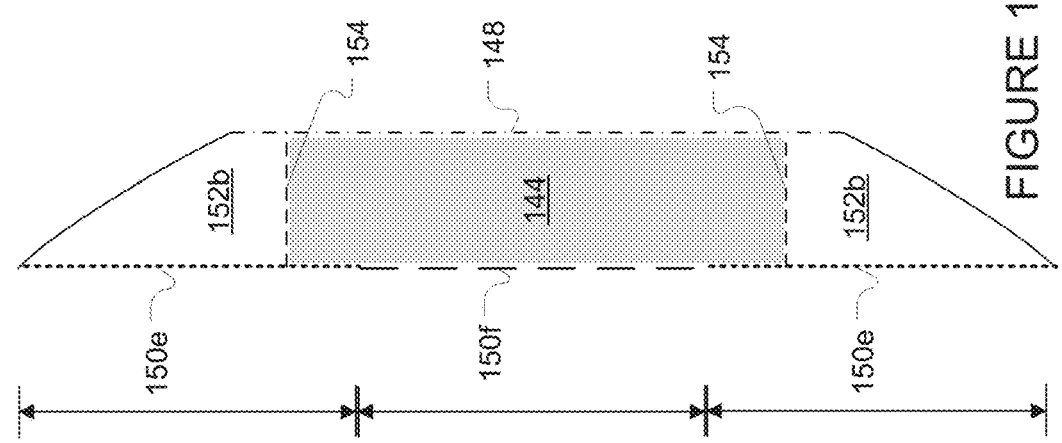

Referring now to FIG. 14G, scanner/optimizer system 116 calculates a first cut pattern for section 102a of the precut module to open faces along the primary workpiece (predicted cut line 148). Second and third cut patterns are calculated for implementation by section 102b and first saw module 104, respectively, to cut the workpiece along corresponding portions 150e and 150f of predicted cut line 150. A fourth cut pattern is calculated for implementation by second saw center 108 to cut the resulting flitch longitudinally along predicted cut lines 154 into the predicted side board 144 and pieces of extraneous material 152b.

Figure 14F:
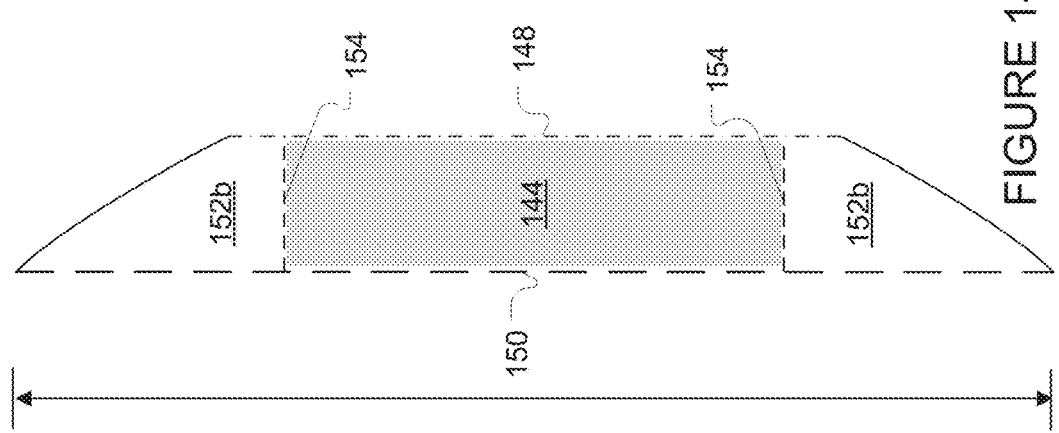

In some embodiments, scanner/optimizer system 116 may calculate the second/third cut pattern based on the difference between the desired depth of cut at first saw module 104 and the total depth of the through-cut (FIG. 14F, double arrow). In some embodiments, scanner/optimizer system 116 may determine the difference by subtracting the desired depth of cut from the total depth of the through-cut, and use the difference as the depth of first portion 150e of predicted cut line 150. Optionally, if a value is represented as a range (e.g., 6-7 inches), the median of the range may be used as the value (e.g., 6.5 inches). As an example, if the total depth of predicted cut line 150 is 14 inches and the desired depth of cut for first saw center 104 is 6.5 inches, scanner/optimizer system 116 may calculate the second cut pattern to give the first portion 150e a depth of 7.5 inches, and calculate the third cut pattern to give the second portion 150f a depth of 6.5 inches.

Alternatively, scanner/optimizer system 116 may divide the total depth of the through-cut evenly among multiple saw modules by default, unless doing so would exceed the desired depth of cut at the corresponding saw module. For example, scanner/optimizer system 116 may divide the total depth of the through-cut by the number of saw modules and compare the dividend to the desired depth of cut. Scanner/optimizer 116 may choose to divide the total depth of the through-cut evenly among the saw modules if the dividend does not exceed the desired depth of cut, or is within a desired range of depths of cut, or if it otherwise falls within a predefined limits (e.g., within 5% of the desired value/range), or the like. In this example, if the total depth of the through-cut is 14 inches, scanner/optimizer system 116 may divide the total depth by two (i.e., for section 102b and first saw center 104) and compare the remainder (7) with the desired depth of cut at first saw module 104 (6-7 inches). Because the remainder does not exceed the desired range of depths, scanner/optimizer system 116 may calculate the second and third cut patterns to give both portions 105e, 150f of the through-cut the same depth (7 inches). If the remainder does not fall within the predefined limits, scanner/optimizer system 116 may determine that the total depth of cut cannot be distributed evenly among the saw modules, and calculate the second and third cut patterns to give portion 150f the desired depth of cut and portion 150e the remaining depth of cut.

Alternatively, scanner/optimizer system 116 may calculate the second/third cut patterns in any other suitable manner. In addition, scanner/optimizer system 116 may calculate one or more alternative groups of cut patterns in some embodiments. For example, scanner/optimizer 116 may calculate one group of cut patterns based on the difference between the desired depth of cut at first saw module 104 and the total depth of the through-cut, and a second group of cut patterns in which the total depth of the through-cut is evenly distributed among section 102b and first saw module 104. In such cases, scanner/optimizer system 116 may evaluate the groups of cut patterns and select one group for implementation based on profitability.

In other embodiments, the precut module may include a section 102c with one or more additional circular saws 120. If so, the second and third sections 102b, 102c may be used to pre-cut the same workpiece or different workpieces. For example, they may be used to pre-cut opposite sides of the same workpiece, or to pre-cut the same workpiece along different predicted cut lines, or to pre-cut the same workpiece along the same predicted cut line (e.g., by dividing the depth of the cut among sections 102b and 102c and first saw module 104). Alternatively, the two sections may be used in an alternating manner to pre-cut different workpieces, which may help to reduce gaps required for repositioning the circular saws between successive workpieces.

Moreover, although this Example describes pre-cutting a workpiece with circular saws, the skilled artisan will readily understand from the present disclosure that the same or similar methods and operations could be performed instead with profiling heads. Thus, in embodiments with a precut module that has profiling heads instead of circular saws 120, scanner/optimizer system 116 may be configured to calculate cut patterns based at least on parameters such as desired depth of cut at first saw module 104, the difference between the desired depth of cut and a total depth of a predicted cut, and the like, and to distribute the depth of cut among the profiling heads and first saw module 104 in the same or similar manner.

Example 3

In some cases, a cut solution may define an inner side board and a narrower outer side board along one side of the primary workpiece. Various processing strategies may be used to cut the inner and outer side boards from the primary workpiece, depending in part on the number of profiler units.

In this Example the shaded side boards 144 of FIG. 14A are considered outer side boards, and the immediately adjacent center boards 146 are considered inner side boards. Workpiece processing system 100 has at least one profiler unit (e.g., section 102b), and may optionally have a second profiler unit (e.g., section 102c). Otherwise, the configuration and operations of workpiece processing system 100 and its components (e.g., scanner/optimizer 116) are generally as described in the preceding Examples, unless stated otherwise.

Again, scanner/optimizer system 116 may calculate one group of cut patterns based on a given parameter (e.g., desired cut depth or throughput at a saw module) or calculate multiple groups of cut patterns and select one group for implementation based on a benefit of that group (e.g., in terms of throughput speed, wood volume recovery, etc.).

Two Profiler Units:

In embodiments with two profiler units (e.g., section 102b and section 102c) upstream of the saw center, each profiler unit may be used to profile a corresponding one of the side boards. Alternatively, one of the profiler units could be used to profile the corresponding side board, and the other could be used to profile a block that will be sent to the edger to obtain the other side board. As another alternative, the profiler units could be used to profile two blocks that will be sent to the edger to obtain the corresponding side boards. In any case, the outer side board or block could be severed with a first cut, and the inner side board or block could be severed from the remainder of the workpiece with a second cut.

Thus, scanner/optimizer system 116 may calculate at least one group of cut patterns that includes a cut pattern for the first profiler unit and another cut pattern for the second profiler unit.

One possible group of cut patterns might include cut patterns for implementation by the two profiler units, collectively, to cut the workpiece along predicted cut lines 154 and 146a (if profiling both side boards). A second possible group of cut patterns might include cut patterns for implementation by the two profiler units, collectively, to cut the workpiece along predicted cut lines 156 (FIG. 14E) and 146a (if profiling the inner side board and a block for the outer side board). A third possible group of cut patterns might include cut patterns for implementation by the two profiler units, collectively, to cut the workpiece along predicted cut lines 154 and an outermost portion of predicted cut line 146c that stops short of predicted cut line 146a (if profiling the outer side board and a block for the inner side board). A fourth possible group of cut patterns might include cut patterns for implementation by the two profiler units, collectively, to cut the workpiece along predicted cut lines 156 and the outermost portion of predicted cut line 146c (if profiling blocks for both the inner and outer side boards).

One Profiler Unit:

In other embodiments, the same side boards may be obtained without using a second profiler unit. For example, a single profiler unit (e.g., section 102b) may be used to form the profile of a block that is at least as wide as the inner side board and has the combined thickness of both side boards (adjusted for kerf, etc.). The outer portion of the block may be severed with a first cut and sent to the edger in order to obtain the outer side board, and the inner portion of the block may be severed from the remainder of the workpiece with a second cut.

One option is to profile the block to substantially the same width as the inner side board, such that the inner portion need not be sent to the edger. Another option is to profile the block to a greater width than the inner side board, and to send both the inner and outer portions to the edger to obtain the corresponding side boards.

Thus, the scanner/optimizer system 116 may calculate one or more groups of cut patterns. Each group may include a corresponding cut pattern for the profiler unit. One possible group of cut patterns might include a cut pattern for implementation by the profiler unit to cut the workpiece along predicted cut lines 146a to the intersections of those cut lines with predicted cut lines 146c (FIG. 14A), or vice versa (if profiling a block the same width as the inner side board). Another possible group of cut patterns might include a cut pattern for implementation by the profiler unit to cut the workpiece along the outermost portions of predicted cut lines 146c, stopping short of predicted cut line 146a (if profiling a block that is wider than the inner side board). Alternatively, if the single profiler unit is provided with stepped profiling heads it may be used to profile one or both of the side boards.

Scanner/optimizer system may also calculate corresponding cut patterns for other machine centers, such as section 102a, first saw module 104, and/or second saw module 108. For example, the group(s) of cut patterns may include a cut pattern for implementation by first saw module 104 to make the first and second cuts. Alternatively, the group(s) of cut patterns may include a cut pattern for implementation by first saw module 104 to make one of the cuts, and another cut pattern for implementation by another saw module to make the other cut (e.g., second saw module 108, or an additional section of the precut module with at least one circular saw). Optionally, one or both of the cuts required to sever the inner and outer portions of the blocks may be made partially by one saw module and partially by another saw module. For example, a first portion of the cuts may be made by an additional section of the precut module with at least one circular saw, and the remainder of the cuts may be made by first saw module 104 and/or third saw module 112.

Example 4

Profiling both profiling heads and circular saws upstream of the saw module may increase the number of options for implementing a given cut solution. In this Example, workpiece processing system 100 is configured generally as described in Example 1, except that section 102b of precut module 102 includes profiling heads 136, and a section 102c of precut module 102 includes circular saws 120. Otherwise, the configuration and operations of workpiece processing system 100 and its components (e.g., scanner/optimizer 116) are generally as described in the preceding Examples, unless stated otherwise.

Scanner/optimizer system 116 calculates a cut solution for a primary workpiece. Scanner/optimizer system 116 also calculates cut patterns for the workpiece based on the cut solution. Optionally, scanner/optimizer system 100 may also identify a desired depth of cut for a saw module (e.g., first saw module 104) and the depth of cut required to implement a predicted cut line (e.g., predicted cut line 150). The values may be identified or determined generally as described in the preceding Examples, or by any other suitable method. Again, the cut solution and/or cut patterns may be calculated based at least in part on the desired depth of cut, throughput speed, and/or other factors as described above.

However, in this example the configuration of workpiece processing system 100 allows the through-cut to be distributed among three machines—a profiler unit (section 102b), a presaw unit (section 102c), and a saw module (first saw module 104). Therefore, scanner/optimizer system 116 may calculate a group of cut patterns that includes cut patterns for each of section 102b, section 102c, first saw module 104, and second saw module 108 (e.g., an edger).

Scanner/optimizer system 116 may calculate the cut patterns to distribute the total depth of the through-cut among the profiler unit, presaw unit, and saw module. As shown for example in FIG. 14H, the cut patterns for each of section 102b, section 102c, and first saw module 104 may define corresponding portions 150g, 150e, and 150f, respectively, of predicted cut line 150. The cut pattern for section 102b may define the profile of a block 158 to be formed along the workpiece by removing extraneous material 152c. The block may be severed from the remainder of the workpiece by section 102c and first saw center 104, and cut into the desired cut product (side board 144) and other pieces (extraneous material 152d) by second saw center 108, according to the corresponding cut patterns.

Scanner/optimizer system 116 may distribute the depth of cut among the profiler unit, presaw unit, and saw module in the same or similar manner as described in the preceding Examples. For instance, the cut patterns may be calculated to distribute the depth of cut evenly among all of the machines, or to give a desired depth of cut to a particular machine.

Optionally, scanner/optimizer system 116 may calculate multiple groups of cut patterns and select one group for implementation, as generally described in any or all of the preceding Examples. For instance, scanner/optimizer system 116 may calculate any or all of the cut patterns described in Examples 1-3 and illustrated in FIGS. 14B-H. Each group of cut patterns may be configured for implementation by a different combination of machine centers. One group might include cut patterns for section 102b and first saw center 104, but not for second saw center 108 (e.g., to profile the side board as in FIG. 14D). Another group might include cut patterns for section 102b, first saw center 104, and second saw center 108, but not for section 102c (e.g., to profile and cut a block as in FIG. 14E, without using section 102c). Yet another group might include cut patterns for section 102c, first saw center 104, and second saw center 108, but not for section 102b (e.g., to pre-cut a flitch and cut the side board from the flitch as in FIG. 14G).

Scanner/optimizer system 116 may assess the groups of cut patterns and select one group for implementation based on one or more parameters, in the same or similar manner as described in the preceding Examples.

Methods

Embodiments of methods described herein may provide increases in throughput and/or wood volume recovery over prior processing methods. For example, profiling a block along a primary workpiece and sending the block to the edger may allow throughput speed through the saw to be maintained or increased. The straight-edged block may also be positioned more quickly and accurately at the edger than a corresponding flitch, which may further increase throughput at little or no cost to wood volume recovery.

FIGS. 15-18 are flow diagrams that illustrate embodiments of such methods, described further below. For clarity, the term "block" is capitalized and followed by the corresponding block number ("Block XXX") when used below in reference to operations of the flow diagrams. Otherwise, the term "block" is used in reference to a particular type of cut product as defined above (e.g., generally opposite machined faces, at least one longitudinal side machined along all or part of its length, and wider than the corresponding final cut product). While the Blocks are shown in a particular order by way of example, it is to be understood that in various embodiments the corresponding actions/processes may be performed in any order and/or any suitable number of times. Therefore, the order and number of actions/processes is not intended to be limiting.

Figure 15:
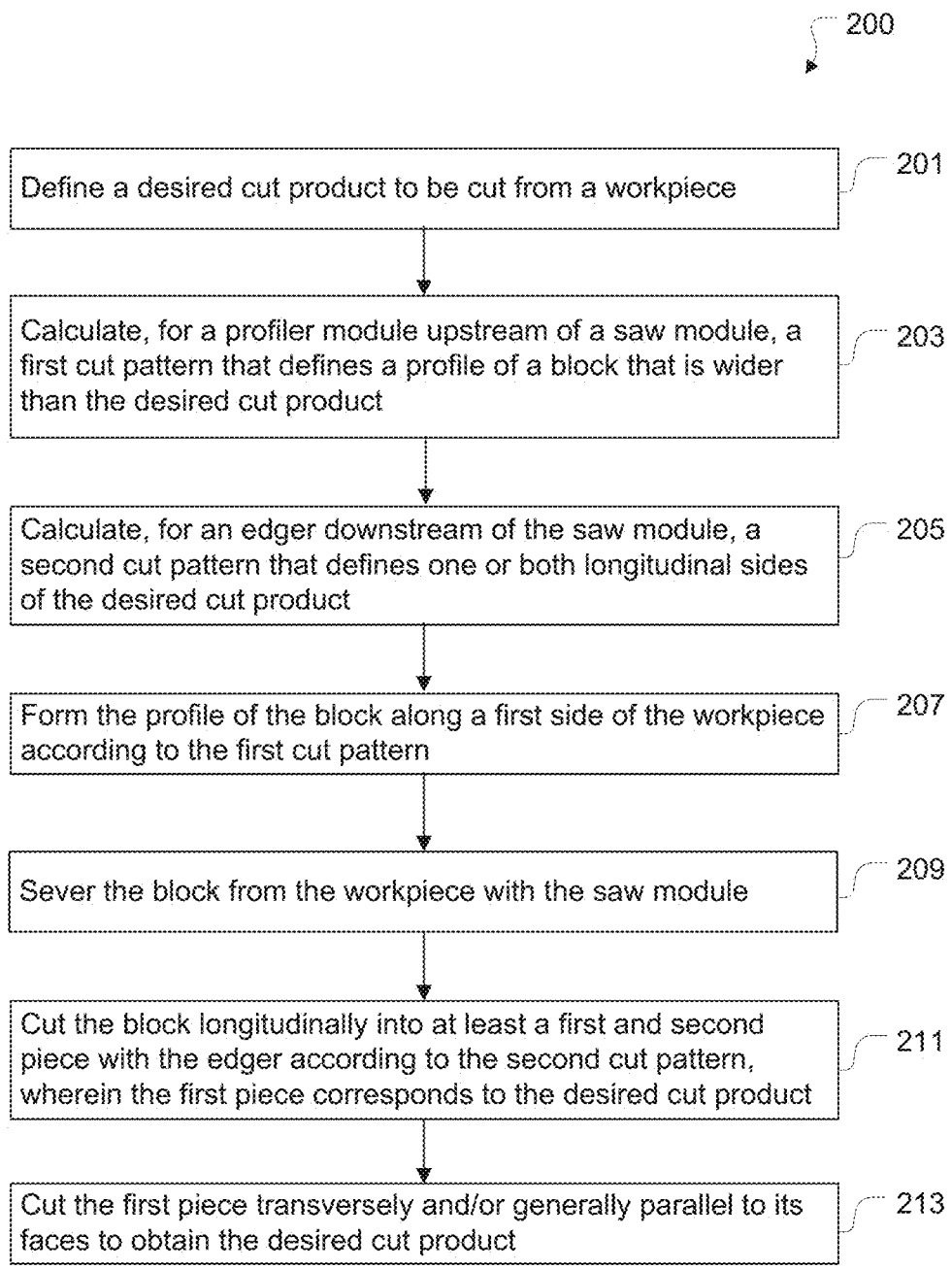
FIG. 15 illustrates a flow chart of a method for processing a workpiece.

FIG. 15 illustrates a flow chart of a method 200 for processing a workpiece to obtain a desired cut product. In various embodiments, method 200 may involve profiling a block along the workpiece and cutting the desired cut product from the block. This may allow greater wood volume recovery and/or throughput than conventional methods that involve profiling the desired cut product or cutting the desired cut product from a flitch. In some embodiments, various operations of method 200 may be as described in Examples 1-4.

Optionally, method 200 may begin at Block 201 by defining a desired cut product to be cut from a workpiece. Optionally, the desired cut product may be a side board. In some embodiments, the desired cut product may be defined by calculating a cut solution (e.g., an optimized cut solution) for the workpiece. In other embodiments, the desired cut product may be defined by a human operator (e.g., by inputting desired cut products and/or dimensions to scanner/optimizer system 116). Optionally, the desired cut product may be defined by both scanner/optimizer system 116 and a human operator. For example, scanner/optimizer system 116 may calculate an optimized cut solution, and the human operator may provide input to approve or override the optimized cut solution in favor of a second cut solution or a user-defined set of criteria.

Optionally, Block 201 may be performed once for a series of workpieces or omitted altogether. For example, processing lines that are used to cut logs or cants of a very consistent size and shape, and/or very short logs or cants, may be configured to cut all workpieces in the same manner to yield the same cut products. In such cases, the desired cut product may be pre-defined and Block 201 unnecessary. Therefore, method 200 may begin at Block 203 in some embodiments.

At Block 203, a first cut pattern configured for implementation by a profiler module upstream of a saw module may be calculated. The first cut pattern may define a profile of a block to be formed along a first side of the workpiece, and the block may be wider than the desired cut product. In some embodiments, the first cut pattern may be configured for implementation by a profiler unit (e.g., section 102b of precut module 102) disposed upstream of a saw module (e.g., saw module 104).

Optionally, Block 203 may further include calculating an alternative cut pattern configured for implementation by the profiler unit, determining that the first cut pattern is more profitable than the alternative cut pattern, and sending the first cut pattern to the profiler module based on that determination. For example, the alternative cut pattern may define a profile of the desired cut product to be formed along the workpiece. Profitability may be assessed based on one or more parameters related to profitability, such as throughput, wood volume recovery, or the like, as described above.

A second cut pattern configured for implementation by an edger downstream of the saw module may be calculated at Block 205. In various embodiments, the first and second cut patterns may be calculated by a computer system (e.g., scanner/optimizer system 116) operatively coupled with the precut module and/or the edger (e.g., second saw module 108). Alternatively, some embodiments may lack a computer system configured to calculate the cut patterns, or may use a single cut pattern for multiple workpiece, and the method may begin at Block 207.

At Block 207, the profile of the block may be formed along a first side of the workpiece by the profiler unit. Optionally, at Block 207 the computer system may determine a benefit of the first cut pattern relative to the alternative cut pattern (e.g., determine that the first cut pattern is more profitable than the alternative cut pattern) and select the first cut pattern for implementation based on the benefit.

At Block 209, the block may be severed from a remaining portion of the workpiece by the saw module downstream of the precut module. In some embodiments, a cut pattern for the saw module may be calculated at Block 203, 205, or 209.

At Block 211, the block may be cut longitudinally into at least a first piece and a second piece by the edger according to the second cut pattern. The first piece may correspond to the desired cut product, and may have substantially the same width as the desired cut product. In some embodiments, the desired cut product may be an output of the edger that requires trimming, splitting, or other processing to obtain a final cut product. In any case, if the first piece has substantially the width, length, and thickness of the desired cut product, the method may end at Block 211.

Alternatively, the desired cut product may be a final cut product, and the first piece may be an intermediate cut product to which one or more additional cuts must be made in order to obtain the desired cut product. In some embodiments the first piece may be longer/thicker than the desired cut product, and the method may proceed to Block 213.

At Block 213, the first piece may be cut transversely to a longitudinal axis of the first piece (i.e., trimmed) or cut along a plane that is generally parallel to the faces of the first piece (i.e., split) in order to obtain the desired cut product. The cut(s) may be made by a trimmer, a splitter saw, or both. As an example, the desired cut product may be a side board, and the first piece may be trimmed by a trim saw and/or split by a splitter saw to yield the side board and one or more other pieces.

Optionally, method 200 may further include forming the profile of a second desired cut product, or a block that is wider than the second desired cut product, along the same or different side of the workpiece. For example, the first and second desired cut products may be inner and outer side boards. In some embodiments, one group of cut patterns may be calculated based on a cut solution and/or one or more other parameters. Alternatively, multiple groups of cut patterns may be calculated and one group may be selected based on the parameter(s). For example, where two desired cut products are inner and outer side boards, the computer system may determine whether it is most profitable to profile both side boards along the primary workpiece, to profile two blocks and send them both to the edger to obtain the side boards, or to profile one side board and one block.

Figure 16:
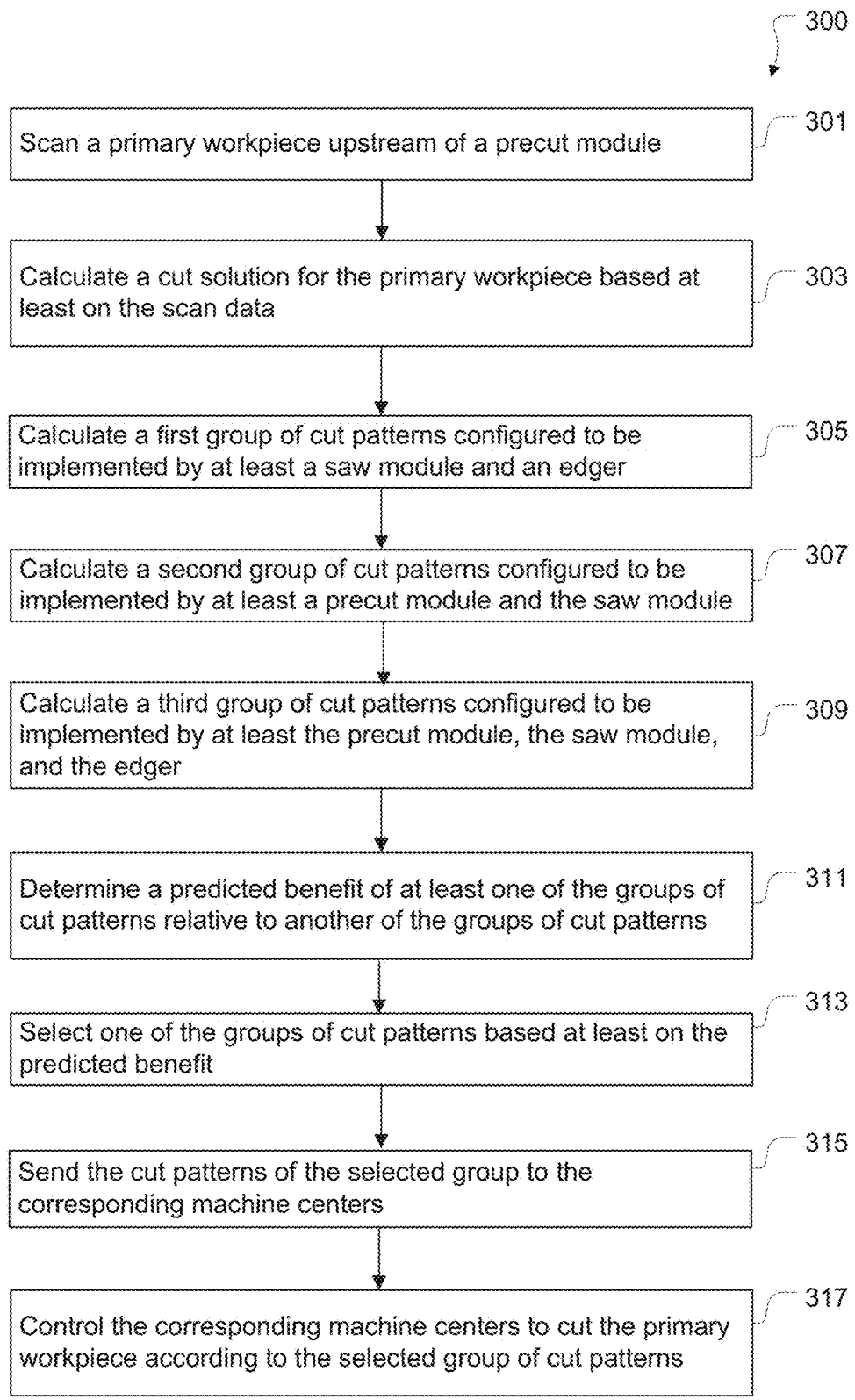
FIG. 16 illustrates a flow chart of another method for processing a workpiece.

FIG. 16 illustrates a method 300 of processing a workpiece, in accordance with various embodiments. In various embodiments, method 300 may involve calculating at least two groups of cut patterns and selecting one of the groups for implementation based on profitability. In some embodiments, various operations of method 300 may be as described in Examples 1-4.

At Block 301, a primary workpiece may be scanned upstream of a precut module (e.g., precut module 102). In some embodiments, the primary workpiece may be scanned by a scanner (e.g., sensor 116a) operatively coupled to a computer system (e.g., computing device 116b). Optionally, the scanner and computer system may collectively form a scanning and optimization system such as scanner/optimizer system 116.

Optionally, at Block 303, a cut solution (e.g., cut solution 142 of FIG. 14A) may be calculated for the primary workpiece based at least on the scan data. The cut solution may define a group of predicted cut products (e.g., predicted cut products 144, 146 of FIG. 14A) and corresponding predicted cut lines (e.g., dashed lines of FIG. 14A). Optionally, at least one of the predicted cut lines may define a through-cut through the primary workpiece. In some cases, the through-cut may extend between adjacent predicted cut products (e.g., between a side board and a center board/cant, inner and outer side boards, or two center boards).

In some embodiments, the primary workpiece may be scanned and/or the cut solution calculated before the primary workpiece arrives at the processing facility. Thus, some embodiments may lack Block 301 and/or Block 303.

At Block 305 a first group of cut patterns may be calculated for the primary workpiece. The first group of cut patterns may be configured to be implemented by at least a saw module (e.g., first saw module 104) and an edger (e.g., second saw module 108). For example, the first group of cut patterns may include a cut pattern for the saw module and a cut pattern for the edger. Optionally, the first group of cut patterns may further include one or more additional cut patterns for another device or machine center.

At Block 307 a second group of cut patterns may be calculated for the primary workpiece. The second group of cut patterns may be configured to be implemented by at least a precut module (e.g., precut module 102) and the saw module. For example, the second group of cut patterns may include a cut pattern for the precut module and a cut pattern for the saw module. Optionally, the second group of cut patterns may further include one or more additional cut patterns for another device or machine center.

Optionally, at Block 309 a third group of cut patterns may be calculated for the primary workpiece. The third group of cut patterns may be configured to be implemented by at least the precut module, the saw module, and the edger. For example, the third group of cut patterns may include a cut pattern for the precut module, a cut pattern for the saw module, and a cut pattern for the edger. Any or all of the groups of cut patterns may further include one or more additional cut patterns for another device or machine center. Other embodiments may lack Block 309.

A predicted benefit of one of the groups of cut patterns relative to the other group(s) of cut patterns may be determined at Block 311. In some embodiments, determining the predicted benefit may involve determining a value for each calculated group of cut patterns based on one or more parameters that relate to profitability (e.g., predicted throughput speed/volume, predicted wood volume recovery). The values may be compared to identify the most profitable group of cut patterns.

At Block 313 one of the groups of cut patterns may be selected for implementation based at least on the predicted benefit. For example, the group of cut patterns determined to be the most profitable in terms of wood volume recovery and/or throughput may be selected for implementation.

At Block 315 the cut patterns of the selected group may be sent to the corresponding machine centers. At Block 317 the corresponding machine centers may be controlled to cut the primary workpiece according to the selected group of cut patterns.

Figure 17:
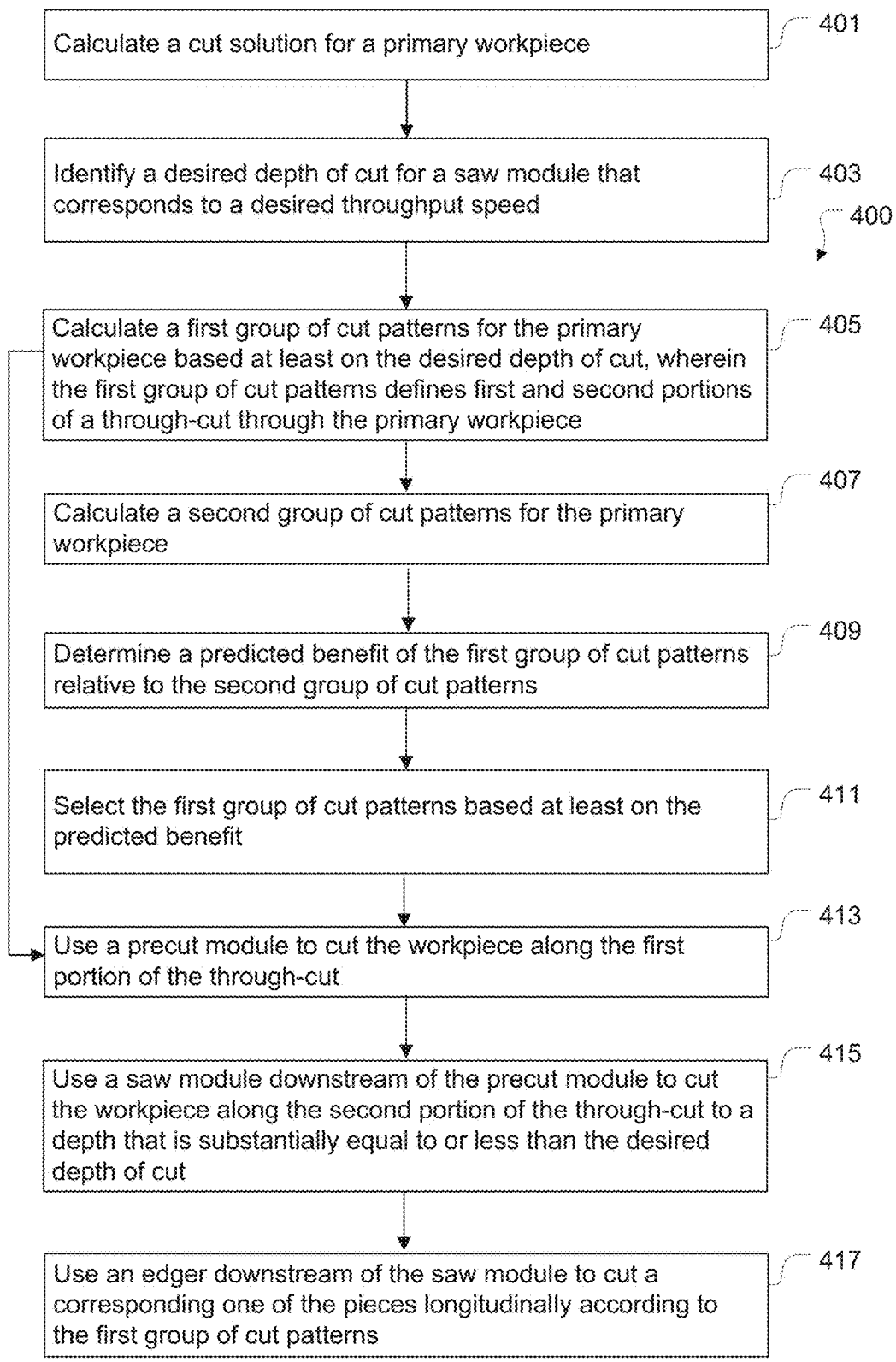
FIG. 17 illustrates a flow chart of another method for processing a workpiece.

FIG. 17 illustrates a method 400 of processing a workpiece, in accordance with various embodiments. In various embodiments, method 400 may involve calculating one or more groups of cut patterns based at least on a desired depth of cut for a given machine center, such as a saw module. This may allow the depth of a required cut to be distributed among multiple machine centers for greater throughput speed. In some embodiments, various operations of method 400 may be as described in Examples 1-4.

At Block 401, a cut solution may be calculated for a primary workpiece. The cut solution may define a group of predicted cut products (e.g., predicted cut products 144, 146 of FIG. 14A) and corresponding predicted cut lines (e.g., dashed lines of FIG. 14A). Optionally, one or more of the predicted cut lines may define a through-cut through the primary workpiece. In some embodiments, the primary workpiece may be scanned and/or the cut solution calculated before the primary workpiece arrives at the processing facility. Thus, some embodiments may lack Block 401.

At Block 403 a desired depth of cut may be identified for a saw module (e.g., first saw module 104). The desired depth of cut may correspond to a throughput speed for that saw module. In some embodiments, the saw module may have a range of cut depths and each cut depth may have a corresponding throughput speed, and the desired depth of cut may be determined based at least on that relationship. Alternatively, the desired depth of cut may be identified based on operator input, a current throughput speed, a current cut depth, or the like.

At Block 405 a first group of cut patterns may be calculated for the primary workpiece based at least on the desired depth of cut. The first group of cut patterns may define first and second portions of a through-cut through the primary workpiece. In some embodiments, the cut solution may define the through-cut as a predicted cut line (e.g., predicted cut line 150), and the first and second portions of the through-cut may be portions of the predicted cut line to be cut by corresponding machine centers. For example, the first group of cut patterns may include a first cut pattern for a profiler or presaw unit (e.g., second section 102a) of a precut module (102) upstream of the saw module, and a second cut pattern for the saw module. The first cut pattern may define the first portion of the through-cut and the second cut pattern may define the second portion of the through-cut. The second portion of the through-cut may have a depth that is less than, or equal to, the desired depth of cut for the saw module.

In some embodiments, method 400 may proceed from Block 405 to Block 413.

In other embodiments, method 400 may proceed from Block 405 to Block 407. At Block 407 a second group of cut patterns may be calculated for the primary workpiece based on the same or different cut solution. Optionally, the second group of cut patterns may be configured to distribute the depth of the through-cut differently than the first group of cut patterns. For example, one of the groups of cut patterns may be configured to distribute the depth of the through-cut substantially equally among the saw module and one or more profiler or presaw units, and another of the groups of cut patterns may be configured to distribute the depth of the through-cut such that the second portion of the through-cut is approximately equal to the desired depth of cut for the saw module.

At Block 409 a predicted benefit of the first group of cut patterns may be determined relative to the second group of cut patterns. In some embodiments, determining the predicted benefit may involve determining a value for each group of cut patterns based on one or more parameters that relate to profitability (e.g., predicted throughput speed/volume, predicted wood volume recovery). The values may be compared to identify the most profitable group of cut patterns.

At Block 411 the first group of cut patterns may be selected for implementation based at least on the predicted benefit. For example, the first group of cut patterns may be selected as the most profitable group of cut patterns in terms of wood volume recovery and/or throughput.

At Block 413 a precut module (e.g., precut module 413) may be used to cut the workpiece along the first portion of the predicted through-cut. The first portion of the through-cut may extend only partially through the workpiece.

At Block 415 the saw module may be used to cut the workpiece along the second portion of the through-cut. This may complete the through-cut, severing the workpiece into at least a first piece and a second piece. In some embodiments, one of the pieces may be a flitch. In other embodiments, one of the pieces may be a block that is wider than the desired cut product.

At Block 417 an edger downstream of the saw module may be used to cut one of the pieces (e.g., the flitch or block) longitudinally into at least a third and a fourth piece according to the first group of cut patterns. In some embodiments, the third or fourth piece may be the desired cut product. In other embodiments, method 400 may further include cutting the third or fourth piece into the cut product and one or more additional pieces (e.g., with a trimmer saw and/or a splitter saw).

Figure 18:
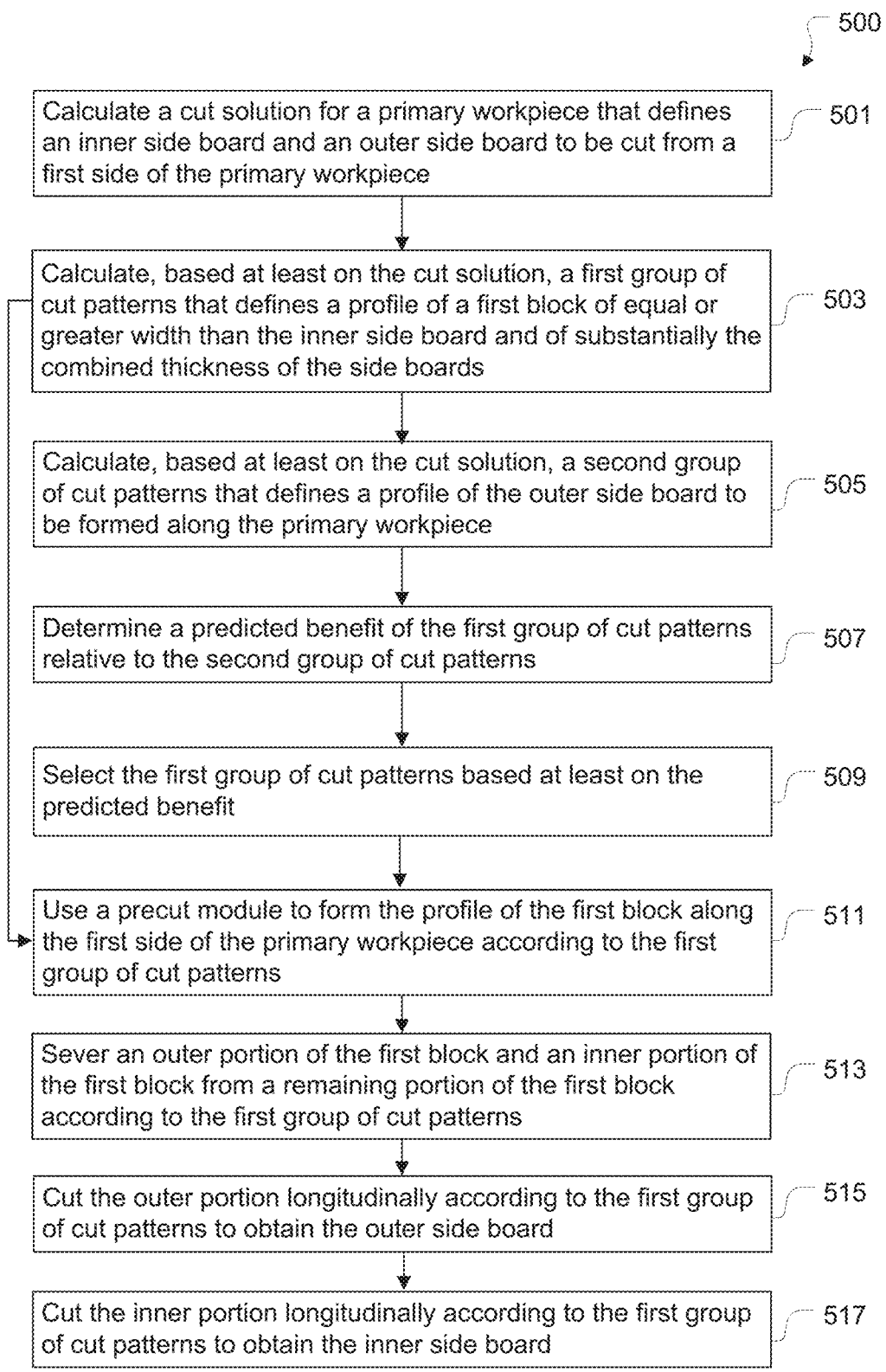
FIG. 18 illustrates a flow chart of a method for processing a workpiece.

FIG. 18 illustrates a method 500 of processing a workpiece, in accordance with various embodiments. In various embodiments, method 500 may be used to obtain a pair of side boards by profiling a block that corresponds to both side boards, cutting inner and outer portions of the block from the remaining portion of the workpiece, and cutting the outer portion of the block to obtain the outer side board. In some embodiments, various operations of method 500 may be as described in Examples 1-4.

At Block 501, a cut solution (e.g., cut solution 142 of FIG. 14A) may be calculated for a primary workpiece. The cut solution may define inner and outer side boards (e.g., adjacent boards 144 and 146 of FIG. 14A) to be cut from one side of the primary workpiece. The cut solution may also define corresponding predicted cut lines (e.g., dashed lines of FIG. 14A).

At Block 503 a first group of cut patterns may be calculated based at least on the cut solution. The first group of cut patterns may define the profile of a first block to be formed along the primary workpiece by one or more profiler units (e.g., section 102b of precut module 102). The profile of the first block may be at least as wide as the inner side board (e.g., side board 144 of FIG. 14A) and substantially as thick as the inner and outer side boards in combination. For example, if the inner side board is 12 inches wide and 2 inches thick, and the outer side board is 6 inches wide and 2 inches thick, the profile of the first block may be at least 12 inches wide and 4 inches thick. In some embodiments, the profile of the first block may be substantially the same width as the inner side board. In other embodiments, the profile of the first block may be wider than the inner side board. In some embodiments, the method may proceed from Block 503 to Block 511.

In other embodiments, the method may proceed from Block 503 to Block 511. At Block 505 a second group of cut patterns may be calculated for the primary workpiece based on the same or different cut solution. The second group of cut patterns may define a profile of the outer side board to be formed along the workpiece. Alternatively, the second group of cut patterns may define the profile of a second block of substantially the same thickness, but different width, than the first block. For example, the first block may be of substantially the same width as the inner side board and the second block may be of greater width than the inner side board, or vice versa.

A predicted benefit of the first group of cut patterns relative to the other group(s) of cut patterns may be determined at Block 507. In some embodiments, determining the predicted benefit may involve determining a value for each calculated group of cut patterns based on one or more parameters that relate to profitability (e.g., predicted throughput speed/volume, predicted wood volume recovery). The values may be compared to identify the most profitable group of cut patterns.

At Block 509 the first group of cut patterns may be selected for implementation based at least on the predicted benefit.

At Block 511 the profile of the first block may be formed along the primary workpiece by the one or more profiler units according to the first group of cut patterns.

At block 513 one or more saws (e.g., first saw module 104) may be used to sever an outer portion of the block and an inner portion of the block from the remaining portion of the primary workpiece. The outer portion of the block may correspond to the outer side board, and the inner portion of the block may correspond to the inner side board. The cuts required to sever the inner and outer portions of the block may be made by one saw module or by multiple saw modules.

At Block 515 the outer portion of the first block may be cut longitudinally (e.g., by an edger) into pieces, at least one of which corresponds to the outer side board.

Optionally, at Block 517, the inner portion of the first block may be cut longitudinally into additional pieces, at least one of which corresponds to the inner side board. In other embodiments, the first block may have substantially the same width as the inner side board, such that the inner portion of the first block requires no additional longitudinal cuts to produce the inner side board. Thus, some embodiments may lack Block 517.

Figure 19:
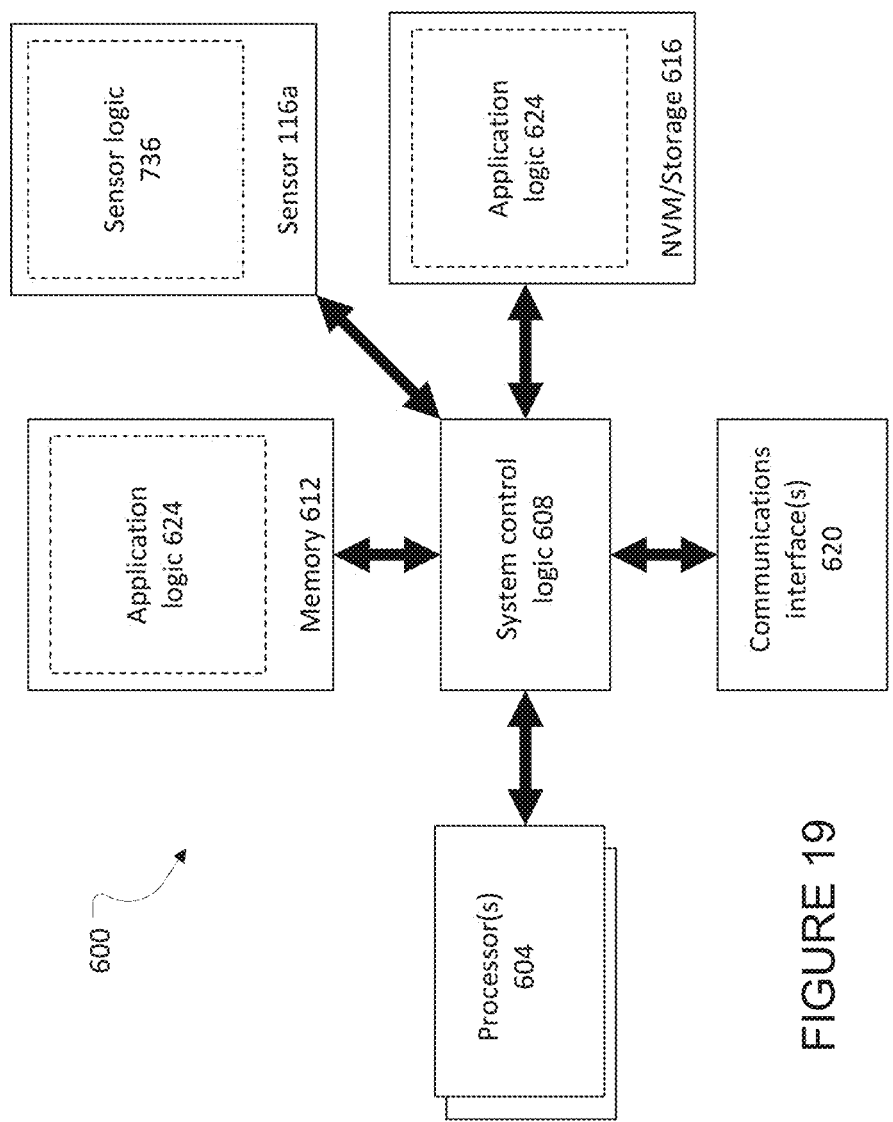
FIG. 19 illustrates an example of a computing device suitable for performing various methods described herein, all in accordance with various embodiments.

FIG. 19 illustrates an example of a computer system 600 suitable for practicing embodiments of the present disclosure. In various embodiments, computer system 600 may have some or all of the features described herein with regard to scanner/optimizer system 116, and/or computing device 116b. Again, while components of computer system 600 are shown in a particular arrangement by way of example, it is to be understood that the arrangement and number of components may vary among embodiments. Therefore, the arrangement and number of components, as well as their corresponding actions/processes, is not intended to be limiting.

As illustrated, computer system 600 may include system control logic 608 coupled to at least one of the processor(s) 604, memory 612 coupled to system control logic 608, non-volatile memory (NVM)/storage 616 coupled to system control logic 608, and one or more communications interface(s) 620 coupled to system control logic 608. In various embodiments, system control logic 608 may be operatively coupled with sensor(s) 116a and/or an output device such as a monitor, speaker, projector, or other such device. In various embodiments the processor(s) 604 may be a processor core.

System control logic 608 may include any suitable interface controller(s) to provide for any suitable interface to at least one of the processor(s) 604 and/or any suitable device or component in communication with system control logic 608. System control logic 608 may also interoperate with the sensor 116a and/or the output device. In some embodiments, the output device may include a programmable logic controller (PLC) operatively coupled to one or more machine centers (e.g., precut module 102, first saw module 104, second saw module 108) and/or component(s) thereof.

System control logic 608 may include one or more memory controller(s) to provide an interface to memory 612. Memory 612 may be used to load and store data and/or instructions, for example, for various operations of workpiece processing system 100. For instance, in some embodiments memory 612 may store relationship information for first saw module 104 (e.g., depths of cut and corresponding throughput speeds). In one embodiment system memory 612 may include any suitable volatile memory, such as suitable dynamic random access memory ("DRAM").

In various embodiments, system control logic 608 may include one or more input/output ("I/O") controller(s) to provide an interface to NVM/storage 616 and communications interface(s) 620.

NVM/storage 616 may be used to store data and/or instructions, for example. NVM/storage 616 may include any suitable non-volatile memory, such as flash memory, for example, and/or any suitable non-volatile storage device(s), such as one or more hard disk drive(s) ("HDD(s)"), solid-state drive(s), compact disc ("CD") drive(s), and/or digital versatile disc ("DVD") drive(s).

The NVM/storage 616 may include a storage resource that may physically be a part of a device on which computer system 600 is installed, or it may be accessible by, but not necessarily a part of, such device. For example, the NVM/storage 616 may be accessed over a network via the communications interface(s) 620.

System memory 612, NVM/storage 616, and/or system control logic 608 may include, in particular, temporal and persistent copies of application logic 624. The application logic 624 may include instructions operable, upon execution by at least one of the processor(s) 604, to cause computer system 600 to practice one or more aspects of operations described herein (e.g., calculation of cut solutions, calculation of cut patterns, identification of desired cut depth or desired throughput speed, determination of benefits or values of groups of cut patterns, selection of a group of cut patterns, implementation of the selected group of cut patterns, etc.).

Optionally, computer system 600 may include sensor 116a coupled with system control logic 608. Sensor 116a may include sensor logic 634. Sensor logic 634 may include instructions operable, upon execution by at least one of the processor(s) 604, to cause computer system 600 to practice one or more aspects of the processes described herein (e.g., scanning a workpiece, generation of sensor data, creation of a dimensional model of the workpiece based on sensor data, etc.).

Communications interface(s) 620 may provide an interface for computer system 600 to communicate over one or more network(s) and/or with any other suitable device. Communications interface(s) 620 may include any suitable hardware and/or firmware, such as a network adapter, one or more antennas, a wireless interface, and so forth. In various embodiments, communication interface(s) 620 may include an interface for computer system 600 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 604, memory 612, and so forth may vary. In various embodiments, computer system 600 may include, but is not limited to, a smart phone, a computing tablet, a laptop computer, a desktop computer, and/or a server. In various embodiments computer system 600 may be, but is not limited to, one or more servers known in the art.

In one embodiment, at least one of the processor(s) 604 may be packaged together with system control logic 608 and/or application logic 624. For example, at least one of the processor(s) 604 may be packaged together with system control logic 608 and/or application logic 624 to form a System in Package ("SiP"). In another embodiment, at least one of the processor(s) 604 may be integrated on the same die with system control logic 608 and/or application logic 624. For example, at least one of the processor(s) 604 may be integrated on the same die with system control logic 608 and/or application logic 624 to form a System on Chip ("SoC").

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of processing a workpiece to obtain a desired cut product, wherein the workpiece is a log or a cant, and the desired cut product is a side board that has opposite faces, opposite longitudinal sides, and opposite ends, the method comprising:
   using one or more first cutting members of a precut module to cut the workpiece longitudinally along a first plane, such that the cut extends only partially through the thickness of the workpiece within the first plane;
   using one or more saws of a first saw module positioned downstream of the precut module to cut the workpiece longitudinally along the first plane to thereby sever an intermediate cut product from a remaining portion of the workpiece, such that the precut module and the first saw module make corresponding first and second portions of a through-cut through the workpiece along the first plane, wherein the intermediate cut product has a width that is greater than the width of the desired cut product; and
   using an edger positioned downstream of the first saw module to cut the intermediate cut product longitudinally into at least a first piece and a waste piece, wherein the waste piece includes at least a portion of a longitudinal side of the intermediate cut product, and wherein the first piece corresponds to the desired cut product,
   wherein the one or more first cutting members is one or more circular saws or profiling heads, and
   wherein the method further includes determining a desired depth of cut for the first saw module based at least on a desired throughput speed through the first saw module, and determining the first portion or the second portion of the through-cut based at least on said desired depth of cut, wherein the second portion of the through-cut is less than or equal to the desired depth of cut.

2. The method of claim 1, wherein the one or more first cutting members is one or more circular saws.

3. The method of claim 1, wherein the precut module includes a profiler, the one or more first cutting members is one or more profiling heads of the profiler, and the intermediate workpiece is a block.

4. The method of claim 3, further including determining or selecting a cut solution for the workpiece, wherein the cut solution defines the desired cut product.

5. The method of claim 4, further including calculating, based at least on the cut solution, a first cut pattern configured to be implemented by the profiler, wherein the first cut pattern defines the longitudinal sides of the block.

6. The method of claim 5, further comprising:
determining a second cut pattern configured to be implemented by the profiler or the edger, wherein the second cut pattern defines the longitudinal sides of the desired cut product;
determining a first difference, if any, in wood volume recovery for the first cut pattern relative to the second cut pattern;
determining a second difference, if any, in throughput for the second cut pattern relative to the first cut pattern;
comparing a value of the first difference to a value of the second difference; and
sending the first cut pattern to the profiler based on said comparing.

7. The method of claim 5, further including calculating an increase in wood volume recovery or a decrease, if any, in throughput speed through the first saw module for the first cut pattern relative to the second cut pattern.

8. The method of claim 5, wherein the cut solution further defines a second desired cut product, and wherein the precut module further includes a second profiler, the method further comprising determining a second cut pattern configured for implementation by the second profiler, wherein the second cut pattern defines the longitudinal sides of the second desired cut product or the longitudinal sides of a second block that is wider than the second desired cut product.

9. The method of claim 5, wherein the first saw module includes one or more saws, the desired depth of cut is a desired depth of cut for the one or more saws, and calculating the first cut pattern includes comparing a total depth of the through-cut to the desired depth of cut.

10. The method of claim 9, further including calculating a second cut pattern configured for implementation by the first saw module, wherein the first cut pattern defines the first portion of the through-cut and the second cut pattern defines the second portion of the through-cut, and the second portion has a depth that is less than or substantially equal to the desired depth of cut for the one or more saws.

11. The method of claim 10, wherein the one or more profiling heads includes at least a first and a second profiling head, the first portion of the through-cut includes opposite ends of the through-cut, and the second portion of the through-cut is between said opposite ends of the through-cut.

12. The method of claim 1, further including:
using one or more second cutting members of the precut module to cut the workpiece longitudinally along a second plane, such that the cut made by the one or more second cutting members extends only partially through the thickness of the workpiece within the second plane;
using another one or more saws of the first saw module to cut the workpiece along the second plane to thereby sever a second intermediate cut product from the remaining portion of the workpiece; and
using the edger to cut the second intermediate cut product longitudinally into at least a second side board and one or more additional pieces.

13. The method of claim 12,
wherein the one or more first cutting members and the one or more second cutting members are profiling heads and the intermediate cut products are blocks, or
wherein the first one or more cutting members and the second one or more cutting members are circular saws and the intermediate cut products are flitches, or
wherein the first one or more cutting members are profiling heads and the first intermediate cut product is a block, and the second one or more cutting members are circular saws and the second intermediate cut product is a flitch.

14. The method of claim 1, wherein the one or more first cutting members is a first pair of profiling heads, the intermediate cut product is a block, and the precut module further includes a second pair of profiling heads, the method further including:
using the second pair of profiling heads to form a profile of a second desired cut product along the workpiece, wherein the second desired cut product is a second side board; and
severing the second desired cut product from the remaining portion of the workpiece.

15. A system for processing a workpiece to obtain a desired cut product, wherein the workpiece is a log or a cant, and the desired cut product is a side board that has opposite faces, opposite longitudinal sides, and opposite ends, the system comprising:
a precut module having one or more first cutting members;
a first saw module downstream of the precut module;
a second saw module downstream of the first saw module; and
a computer system operatively coupled with the precut module, the computer system having a processor, a memory operatively coupled with the processor, and one or more programmable logic controllers (PLCs) operatively coupled with the processor and the precut module, the first saw module, and the second saw module, wherein the computer system is programmed with instructions operable, upon execution by the processor, to
cause the one or more first cutting members of the precut module to cut the workpiece longitudinally along a first plane, such that the cut extends only partially through the thickness of the workpiece within the first plane;
cause the first saw module to cut the workpiece longitudinally along the first plane, such that the precut module and the first saw module make corresponding first and second portions of a through-cut through the workpiece along the first plane, to thereby sever an intermediate cut product from a remaining portion of the workpiece, wherein the intermediate cut product has a width that is greater than the width of the desired cut product; and
cause the second saw module to cut the intermediate cut product longitudinally into at least a first piece and a waste piece, wherein the first piece corresponds to the desired cut product, and the waste piece has at least a portion of a longitudinal side of the intermediate cut product, wherein the second saw module includes an edger, and the one or more first cutting members is one or more circular saws or profiling heads, and wherein the instructions are operable, upon execution by the processor, to
determine a desired depth of cut for the first saw module based at least on a desired throughput speed through the first saw module, and
determine the first portion or the second portion of the through-cut based at least on said desired depth of cut, wherein the second portion of the through-cut is less than or equal to the desired depth of cut.

16. The system of claim 15, wherein the one or more first cutting members is one or more circular saws.

17. The system of claim 15, wherein the instructions are operable, upon execution by the processor, to determine a cut solution for the workpiece, wherein the cut solution defines the desired cut product.

18. The system of claim 17, wherein the instructions are operable, upon execution by the processor, to determine a first cut pattern for implementation by the one or more first cutting members of the precut module based at least on the cut solution.

19. The system of claim 17, wherein the one or more first cutting members is a profiler and the intermediate cut product is a block, and wherein the instructions are operable, upon execution by the processor, to determine, based at least on the cut solution, a first and a second cut pattern, wherein the first cut pattern is configured for implementation by the profiler and defines the longitudinal sides of the block, and the second cut pattern is configured for implementation by the profiler or the edger and defines the longitudinal sides of the desired cut product.

20. The system of claim 19, wherein the instructions are operable, upon execution by the processor, to:
determine a first difference, if any, in wood volume recovery for the first cut pattern relative to the second cut pattern;
determine a second difference, if any, in throughput for the second cut pattern relative to the first cut pattern;
compare a value of the first difference to a value of the second difference; and
send the first cut pattern to the precut module based on the comparison.

21. The system of claim 19, wherein the instructions are operable, upon execution by the processor, to calculate an increase or decrease, if any, in wood volume recovery or throughput speed through the first saw module for one of the cut patterns relative to the other one of the cut patterns.

22. The system of claim 19, wherein the instructions are operable, upon execution by the processor, to calculate a third cut pattern configured for implementation by the second saw module to cut the block longitudinally into at least the first piece and the waste piece.

23. The system of claim 18, wherein the cut solution defines the through-cut through the workpiece, and wherein the instructions are operable, upon execution by the processor, to
compare a total depth of the through-cut to the desired depth of cut, and
calculate the first cut pattern based at least on a difference between the total depth of the through-cut and the desired depth of cut.

24. The system of claim 23, wherein the first saw module includes one or more saws and the instructions are operable, upon execution by the processor, to calculate a second cut pattern configured for implementation by the first saw module, and wherein the first cut pattern defines the first portion of the through-cut and the second cut pattern defines the second portion of the through-cut.

25. The system of claim 17, further including a scanner positioned upstream of the precut module and configured to detect the workpiece, wherein the instructions are operable, upon execution by the processor, to calculate the cut solution based at least on data received from the scanner.

26. The system of claim 15, wherein the instructions are operable, upon execution by the processor, to
cause one or more second cutting members of the precut module to cut the workpiece longitudinally along a second plane, such that the cut made by the second one or more cutting members extends only partially through the thickness of the workpiece within the second plane;
cause the first saw module to cut the workpiece along the second plane to thereby sever a second intermediate cut product from the remaining portion of the workpiece; and
cause the second saw module to cut the second intermediate cut product longitudinally into at least a third and a fourth piece, wherein the third piece corresponds to a second desired side board.

27. The system of claim 26,
wherein the one or more first cutting members and the one or more second cutting members are profiling heads and the intermediate cut products are blocks, or
wherein the first one or more cutting members and the second one or more cutting members are circular saws and the intermediate cut products are flitches, or
wherein the first one or more cutting members are profiling heads and the first intermediate cut product is a block, and the second one or more cutting members are circular saws and the second intermediate cut product is a flitch.

28. The system of claim 15, wherein the one or more first cutting members is a first pair of profiling heads, the intermediate cut product is a block, and the precut module further includes a second pair of profiling heads, and the instructions are operable, upon execution by the processor, to
cause the second pair of profiling heads to form both longitudinal sides of a second desired cut product along the workpiece, wherein the second desired cut product is a second side board; and
cause the first saw module to sever the second side board from the remaining portion of the workpiece.

* * * * *